US009992750B2

(12) United States Patent
Li et al.

(10) Patent No.: US 9,992,750 B2
(45) Date of Patent: *Jun. 5, 2018

(54) METHODS AND APPARATUS RELATED TO INTERFERENCE MANAGEMENT WHEN SHARING DOWNLINK BANDWIDTH BETWEEN WIDE AREA NETWORK USAGE AND PEER TO PEER SIGNALING

(71) Applicant: QUALCOMM Incorporated, San Diego, CA (US)

(72) Inventors: Junyi Li, Chester, NJ (US); Rajiv Laroia, Far Hills, NJ (US); Xinzhou Wu, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 983 days.

This patent is subject to a terminal disclaimer.

(21) Appl. No.: 13/956,724

(22) Filed: Aug. 1, 2013

(65) Prior Publication Data

US 2013/0316757 A1 Nov. 28, 2013

Related U.S. Application Data

(62) Division of application No. 11/774,498, filed on Jul. 6, 2007, now Pat. No. 8,526,410.

(51) Int. Cl.
*H04W 52/24* (2009.01)
*H04W 52/38* (2009.01)

(52) U.S. Cl.
CPC ....... *H04W 52/243* (2013.01); *H04W 52/383* (2013.01)

(58) Field of Classification Search
CPC ... H04W 52/383; H04W 88/02; H04W 72/02; H04W 8/005; H04W 88/06; H04W 52/04;

(Continued)

(56) References Cited

U.S. PATENT DOCUMENTS 7,336,638 B2  2/2008  Jiang et al.
7,539,507 B2  5/2009  Grob et al.
(Continued)

FOREIGN PATENT DOCUMENTS

CN  1536925 A  10/2004
CN  1549612 A  11/2004
(Continued)

OTHER PUBLICATIONS

European Search Report—EP08006404—Search Authority—Munich—dated Nov. 20, 2008.
(Continued)

*Primary Examiner* — George Eng
*Assistant Examiner* — Jing Gao
(74) *Attorney, Agent, or Firm* — Clint R. Morin; Arent Fox, LLP

(57) ABSTRACT

Methods and apparatus related to the sharing of wide area network (WAN) downlink bandwidth with peer to peer communication signaling usage are described. A WAN, e.g., cellular, wireless communications device using a base station attachment point, transmits a signal to be used by a peer to peer wireless communications device for controlling its peer to peer transmit power level. The peer to peer wireless communications device receives and measures the strength of the power control signal from the WAN wireless communications device. The measurement information is used by the peer to peer wireless communications device in determining whether or not peer to peer signal transmission is permitted and/or in determining a peer to peer transmission power level. Thus the WAN device is able to manage interference from the peer to peer devices in its vicinity which impacts its recovery of WAN base station downlink signals.

39 Claims, 15 Drawing Sheets

(58) Field of Classification Search
CPC ... H04W 16/14; H04W 28/048; H04W 28/18; H04W 40/244; H04W 88/10; H04W 52/325; H04W 52/367; H04W 52/243; H04W 40/08

See application file for complete search history.

(56) References Cited

U.S. PATENT DOCUMENTS

| | | | |
|---|---|---|---|
| 7,548,758 B2 | 6/2009 | Periyalwar et al. | |
| 8,369,800 B2 | 2/2013 | Li et al. | |
| 9,369,972 B2 | 6/2016 | Jung et al. | |
| 2003/0126492 A1 | 7/2003 | Cavin | |
| 2005/0083856 A1* | 4/2005 | Morelli | H04L 12/2803 370/254 |
| 2005/0111383 A1* | 5/2005 | Grob | H04W 52/06 370/254 |
| 2005/0143119 A1 | 6/2005 | Chandra et al. | |
| 2006/0168343 A1 | 7/2006 | Ma et al. | |
| 2006/0245398 A1 | 11/2006 | Li et al. | |
| 2006/0258383 A1 | 11/2006 | Jiang et al. | |
| 2007/0030156 A1 | 2/2007 | Schlager et al. | |
| 2007/0149238 A1 | 6/2007 | Das et al. | |
| 2007/0230392 A1* | 10/2007 | Adams | H04W 52/08 370/318 |
| 2008/0069033 A1 | 3/2008 | Li et al. | |
| 2008/0069039 A1 | 3/2008 | Li et al. | |
| 2009/0010185 A1 | 1/2009 | Li et al. | |
| 2009/0010186 A1 | 1/2009 | Li et al. | |

FOREIGN PATENT DOCUMENTS

| | | |
|---|---|---|
| CN | 1757257 A | 4/2006 |
| CN | 1792048 A | 6/2006 |
| CN | 1906899 A | 1/2007 |
| JP | 2004533158 A | 10/2004 |
| JP | 2006501768 A | 1/2006 |
| JP | 2006520158 A | 8/2006 |
| JP | 2006523408 A | 10/2006 |
| JP | 2007512779 A | 5/2007 |
| JP | 2007517475 A | 6/2007 |
| JP | 2008510344 A | 4/2008 |
| JP | 2009527170 A | 7/2009 |
| JP | 2010504048 A | 2/2010 |
| WO | 02054620 A1 | 7/2002 |
| WO | 02082751 A2 | 10/2002 |
| WO | 2004032380 | 4/2004 |
| WO | 2004077920 A2 | 9/2004 |
| WO | 2004091238 A1 | 10/2004 |
| WO | 05053253 | 6/2005 |
| WO | 2005065271 A2 | 7/2005 |
| WO | 2006016331 A1 | 2/2006 |
| WO | 2006064411 A2 | 6/2006 |
| WO | 2007093653 A1 | 8/2007 |
| WO | 08034023 | 3/2008 |
| WO | 08034029 | 3/2008 |

OTHER PUBLICATIONS

European Search Report—EP09174188—Search Authority—Munich—dated Dec. 3, 2009.

International Search Report and Written Opinion—PCT/US2008/068437, International Searching Authority—European Patent Office, dated Dec. 10, 2008.

Janis, P., et al., "Interference-aware resource allocation for device-to-device radio underlaying cellular networks", Vehicular Technology Conference, VTC Spring 2009. IEEE 69th, Apr. 2009, pp. 1-5.

M. Naraghi-Pour, et al., "Peer-to-Peer Communication in Wireless Local Area Networks" Proceedings of the International Conference on Computer Communications and Networks, Oct. 12, 1998 (Oct. 12, 1998)-Oct. 15, 1998 (Oct. 15, 1998), pp. 432-439, XP002539139, Lafayette, USA, p. 433.

Partial International Search Report—PCT/US08/068437—International Search Authority, European Patent Office—dated Sep. 22, 2008.

Taiwan Search Report—TW097125457—TIPO—dated Oct. 20, 2012.

\* cited by examiner

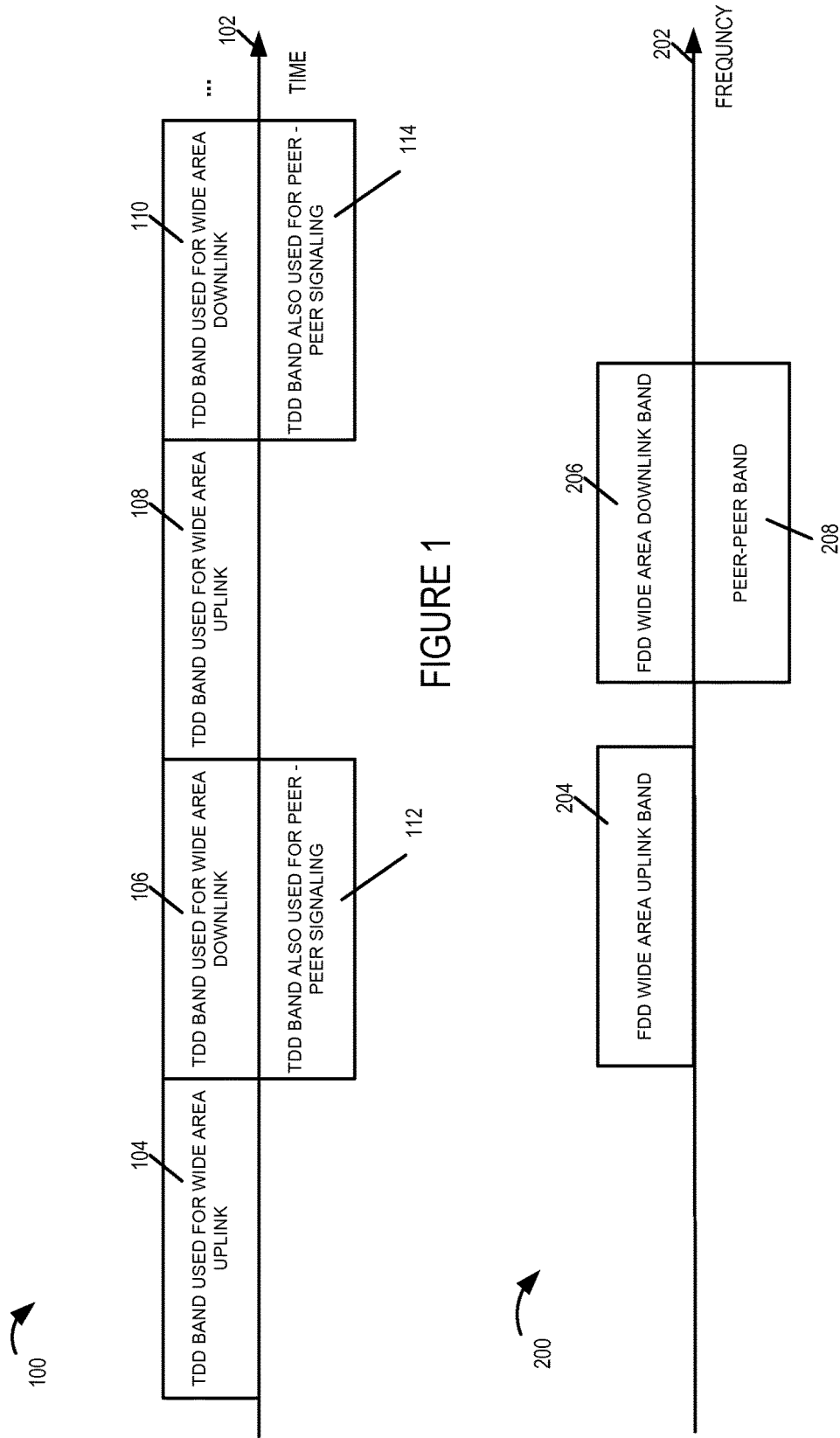

METHODS AND APPARATUS RELATED TO INTERFERENCE MANAGEMENT WHEN SHARING DOWNLINK BANDWIDTH BETWEEN WIDE AREA NETWORK USAGE AND PEER TO PEER SIGNALING

CROSS-REFERENCE TO RELATED APPLICATIONS

This application is a division of U.S. application Ser. No. 11/774,498 filed on Jul. 6, 2007 entitled "METHODS AND APPARATUS RELATED TO INTERFERENCE MANAGEMENT WHEN SHARING DOWNLINK BANDWIDTH BETWEEN WIDE AREA NETWORK USAGE AND PEER TO PEER SIGNALING" which is hereby incorporated in its entirety by reference.

FIELD

The present invention is directed to methods and apparatus for wireless communication, more particularly, to methods and apparatus for use in wireless communication systems including at least some peer to peer wireless communication devices.

BACKGROUND

Wireless spectrum is an expensive and valuable resource. In wide area network systems, e.g., cellular systems, wireless spectrum allocated to the WAN is, at times, less than fully utilized. It would be advantageous if methods and apparatus were developed which recognized and/or utilized such underutilized air link resources. It would be beneficial if such methods and apparatus were adaptive such that interference to the WAN communications generated from the additional usage of the air link resource could be managed.

SUMMARY

Methods and apparatus related to the sharing of wide area network (WAN) downlink bandwidth with peer to peer communication signaling usage are described. A wireless communications device operating in a WAN mode of operations, e.g., cellular mode of operation using a base station attachment point, transmits a signal to be used by a wireless communications device operating in a peer to peer mode of operating in controlling its peer to peer transmit power level.

In some embodiments the signal used for controlling peer to peer transmit power level is a signal transmitted to a base station, e.g., a typical uplink control signal used in maintaining WAN communications. For example, in some embodiments, the signal is one of: a CDMA reverse link pilot channel signal and a single tone OFDM control channel signal. Thus in such embodiments, the signal serves dual purposes: (i) WAN communications link maintenance and (ii) interference control regarding interference sourced from peer to peer signaling, the interference control being obtained via control of peer to peer transmission power levels.

In some embodiments the signal used for controlling peer to peer transmit power level is a peer to peer power reference signal, determined by the wireless communications device in a WAN mode of operation and broadcast with the intent that it will be received and used by wireless communications devices in a peer to peer mode of operation. Such a peer to peer transmit power reference signal is adjusted, in various embodiments, such that a target SNR regarding downlink signals from the base station is maintained at the wireless communications device in the WAN mode of operation.

The wireless communications device in the peer to peer mode receives and measures the strength of the power control signal from the wireless communications device in the WAN mode. The measurement information is used by the peer to peer wireless terminal in determining whether or not peer to peer signal transmission is permitted and/or in determining a peer to peer transmission power level.

An exemplary method of operating a first communications device to use a downlink frequency band for peer to peer communications, the downlink frequency band being used by a base station to communicate with a second communications device, comprises: receiving a signal transmitted by the second communications device; and determining a peer to peer signal transmission power level from the received signal. The determined peer to peer signal transmission power level is, e.g., a maximum permitted peer to peer transmission power level.

An exemplary first communications device which supports use of a downlink frequency band for peer to peer communications, the downlink frequency band being used by a base station to communicate with a second communications device, comprises: a wireless receiver module for receiving a signal transmitted by the second communications device; and a peer to peer signal transmission power level determination module for determining a peer to peer signal transmission power level from the received signal. In some embodiments, the peer to peer signal transmission power level determination module determines a maximum permitted peer to peer transmission power level.

An exemplary method of operating a mobile communications device includes: receiving a signal from a base station; and broadcasting a peer to peer power reference signal based on the received signal. In various embodiments, the method further comprises, prior to performing said broadcasting: measuring the power of the received signal; and determining the reference signal to be broadcast as a function of the measured power.

An exemplary mobile communications device comprises: a wireless receiver module for receiving a signal from a base station; and a wireless transmitter module for broadcasting a peer to peer power reference signal based on the received signal. In various embodiments, the mobile communications device further includes: a power measurement module for measuring the power of the received signal; and a reference signal determination module for determining the peer to peer power reference signal to be broadcast as a function of the measured power.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 1 is a drawing illustrating exemplary bandwidth usage in some embodiments utilizing a time division duplex (TDD) for the wide area network, e.g., for the cellular communications.

FIG. 2 is a drawing illustrating exemplary bandwidth usage in some embodiments utilizing a frequency division duplex (FDD) for the wide area network, e.g., for the cellular communications.

DETAILED DESCRIPTION

Figure 3:
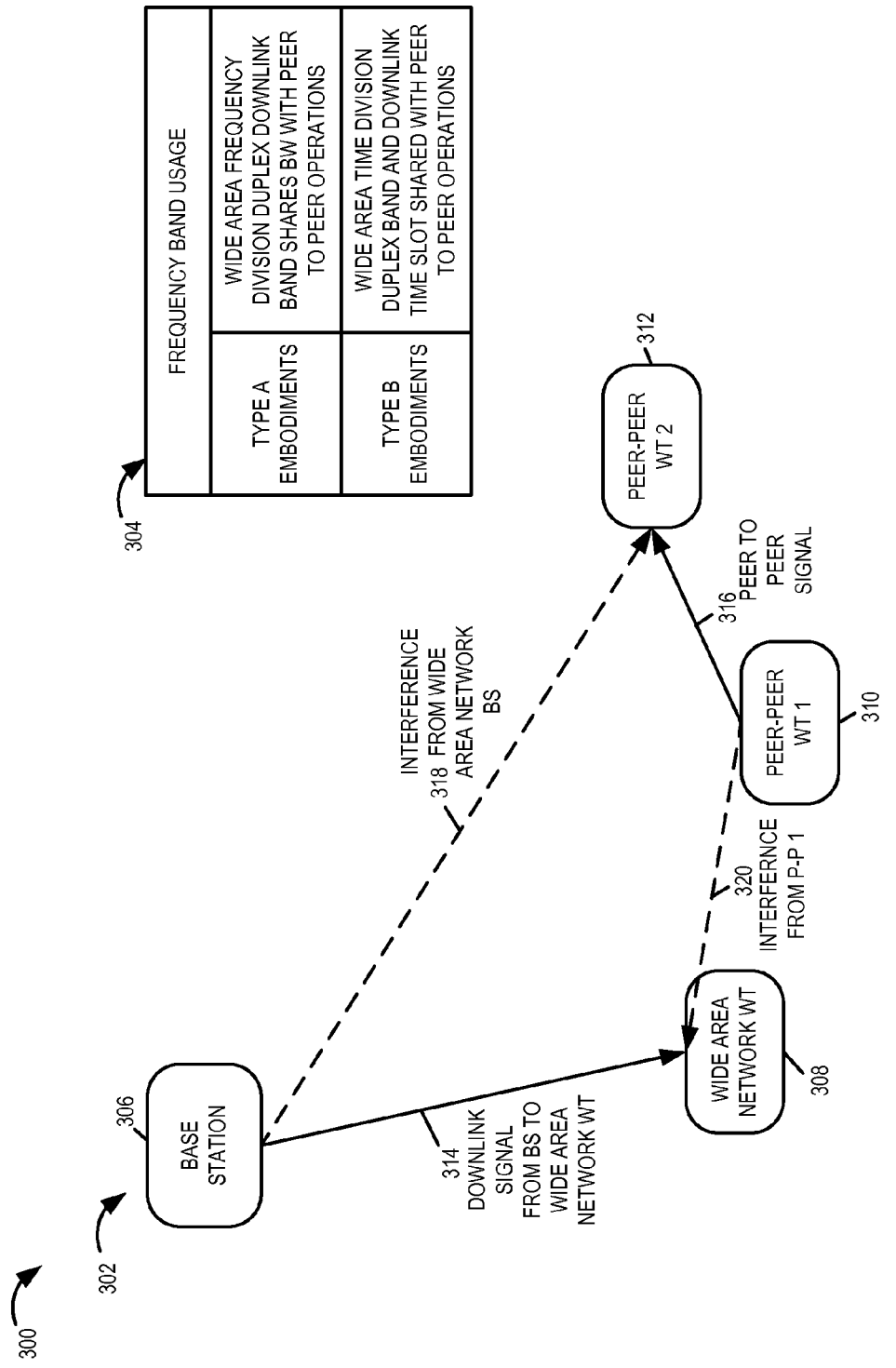
FIG. 3 is a drawing including an exemplary communications system and a frequency band usage table in accordance with various embodiments.

FIG. 1 is a drawing 100 illustrating exemplary bandwidth usage in some embodiments utilizing a time division duplex (TDD) for the wide area network, e.g., for the cellular communications. With respect to the wide area network, e.g., corresponding to a base station, the same frequency band is shared, e.g., in an alternating pattern between uplink and downlink. For example, the TDD band used for the wide area, e.g., cellular communications, is used for (uplink, downlink, uplink, downlink) as indicated by blocks (104, 106, 108, 110), respectively, along time line 102. In addition, time intervals designated to be used for wide area network, e.g., cellular network, downlink are also used for peer to peer signaling, with the same TDD band being used, as indicated by cellular downlink blocks (106, 110) being concurrent with peer to peer blocks (112, 114), respectively.

FIG. 2 is a drawing 200 illustrating exemplary bandwidth usage in some embodiments utilizing a frequency division duplex (FDD) for the wide area network, e.g., for the cellular communications. With respect to the wide area network, e.g., corresponding to a base station, different frequency bands are used by the uplink and downlink. In this exemplary embodiment, the FDD wide area uplink band is represented by block 204 and the FDD wide area downlink band is represented by block 206 along frequency axis 202. In some embodiments, the uplink and downlink bands are adjacent. In some embodiments, the uplink and/or downlink bands include non-contiguous portions. In some embodiments, at least a portion of one of the uplink and downlink bands is included between two different portions of the other one of the uplink and downlink bands.

In addition to the typical cellular based uplink signaling in the FDD wide area uplink band, the band is used for other activities related to peer to peer signaling. Peer to peer wireless terminals also use the same downlink band for peer to peer signaling as indicated by block 208 located on frequency axis 202 corresponding to FDD wide area downlink band 206.

FIG. 3 is a drawing 300 including an exemplary communications system 302 and a frequency band usage table 304 in accordance with various embodiments. In the exemplary communications system 302 a wide area network shares bandwidth with peer to peer communications. In various embodiments, the wide area network corresponds to a deployed system and the peer to peer capabilities involve add to features. In some embodiments both the WAN and peer to peer capabilities are part of an initial deployment. Frequency band usage table 304 indicates two types of embodiments which can correspond to exemplary system 302. In the first type of embodiment, type A embodiments, the wide area network uses frequency division duplex (FDD) and the wide area frequency division duplex downlink band shares bandwidth with peer to peer communications activities. In the second type of embodiment, type B embodiments, the wide area network uses time division duplex (TDD) of the same band for uplink and downlink, and the wide area band shares a downlink time slot with peer to peer communications activities. Thus, in both types of embodiments, the peer to peer communications signals directed between peer to peer communications devices can interfere with the reception of downlink signals from the base station by wide area network wireless terminals, and downlink signaling from the wide area network base station can interfere with reception of peer to peer communications signals by a peer to peer communications device. In various embodiments but not necessarily all embodiments, in general, the reception of downlink signals from a base station by a wide area network wireless terminal is considered to have priority over peer to peer communications. Thus, it is desirable to protect the wireless area network wireless terminals, e.g., mobile nodes, from a high level of interference generated by peer to peer communications. An important consideration is the distance between the peer to peer wireless terminal which is transmitting a peer to peer signal and a wide area network wireless terminal which is attempting to recover a downlink signal from a base station. Other considerations include the power level of the transmission by the peer to peer wireless communications device and channel conditions between the peer to peer wireless terminal and the wide area network wireless terminal.

Exemplary communications system 302 includes a base station 306, a wide area network wireless terminal 308, e.g., a cellular mobile node, a first peer to peer wireless terminal 310, and a second peer to peer wireless terminal 312. For the purposes of illustration consider that base station 306 transmits downlink signal 314 to wide area network wireless terminal 308. Wide area network wireless terminal 308 attempts to receive downlink signal 314 and recover the information communicated. The signal 314 from the perspective of peer to peer wireless terminal 2 312 is viewed as interference 318 from the base station 306. Now consider that the first peer to peer wireless terminal 310 transmits peer to peer signal 316 to peer to peer wireless terminal 2 312. The signal 316 from the perspective of wide area network wireless terminal 308 is viewed as interference 320 from first peer to peer wireless terminal 310.

Figure 4:
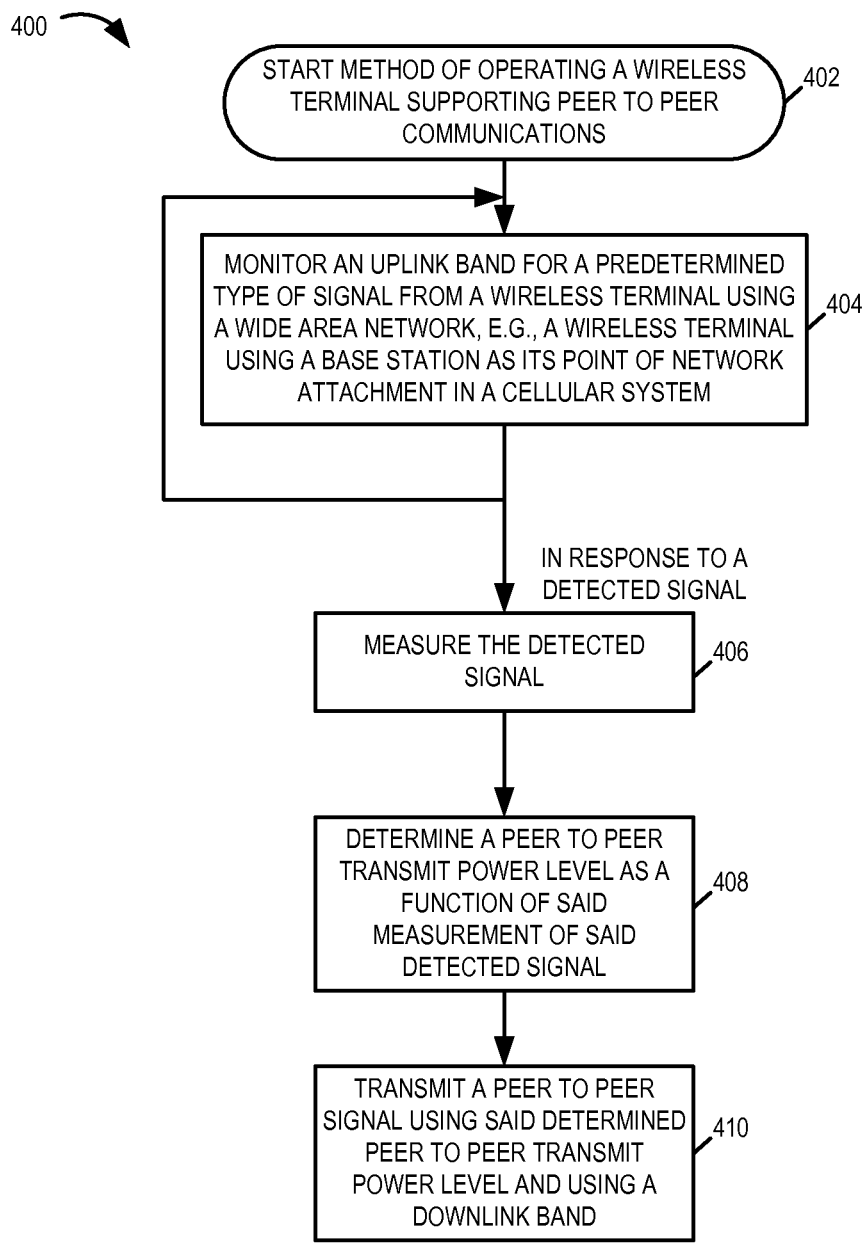
FIG. 4 is a flowchart of an exemplary method of operating a wireless terminal supporting peer to peer communications in accordance with various embodiments.

FIG. 4 is a flowchart 400 of an exemplary method of operating a wireless terminal supporting peer to peer communications in accordance with various embodiments. Operation starts in step 402, where the peer to peer wireless terminal is powered on and initialized. Operation proceeds from start step 402 to step 404. In step 404, the peer to peer wireless terminal monitors an uplink band for a predetermined type of signal from a wireless terminal using a wide area network. The wireless terminal using the wide area network is, e.g., a wireless terminal using a base station as its point of network attachment in a cellular system.

In some embodiments, e.g., an embodiment in which the wide area network is an existing system, the signal being monitored for is a control channel signal. For example, in one exemplary OFDM system, the signal is a dedicated control channel signal using a single tone. As another example, in some CDMA embodiments, the signal is a reverse link control channel signal, e.g., an uplink pilot signal to the base station.

In some other embodiments, e.g., an embodiment in which at least some components of the wide area system include special features used for supporting peer to peer operations, the signal is a new broadcast signal intended to support peer to peer communications in the downlink band, e.g., a single tone user beacon signal. In some embodiments, the wide area network wireless terminal transmits the new broadcast signal in accordance with a recurring schedule, e.g. periodically when attached to the base station. In some embodiments, the wide area network wireless terminal transmits the new broadcast signal when needed, but does not transmit the signal at other times. For example, the wide area network wireless terminal only transmits the new broadcast signal when the downlink signal quality, e.g., SNR, of received downlink signals is below a certain threshold. Thus, in this case, the wide area network wireless terminal transmits this new broadcast signal with the intention of directing a peer to peer wireless terminal in the local vicinity to reduce its transmission power level.

Step 404 is performed on an ongoing basis. Operation proceeds from step 404 to step 406 in response to a detected signal. In step 406 the peer to peer wireless terminal measures the detected signal, e.g., obtaining a received power level. Operation proceeds from step 406 to step 408.

In step 406, the peer to peer wireless terminal determines a peer to peer transmit power level as a function of the measurement of the detected signal. Then, in step 410, the peer to peer communications device transmits a peer to peer signal using said determined peer to peer transmit power level and using a downlink band.

Figure 5:
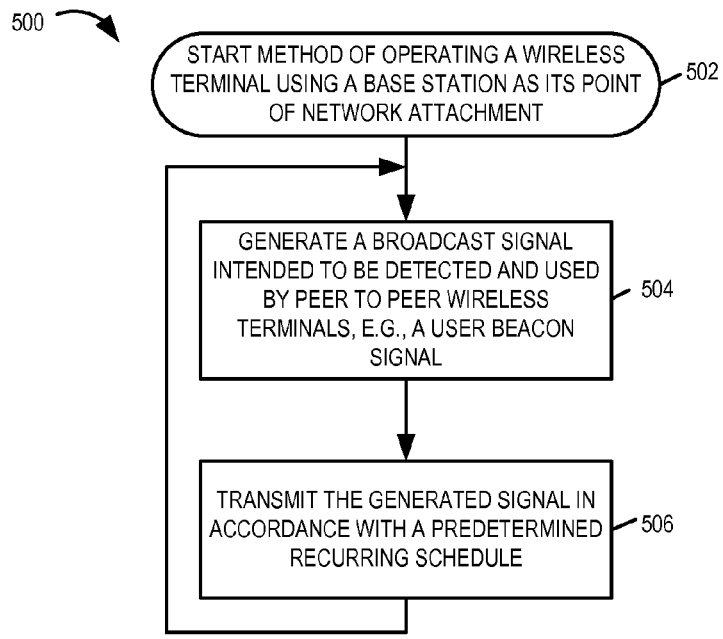
FIG. 5 is a flowchart of an exemplary method of operating a wireless terminal using a base station as its point of network attachment in accordance with various embodiments.

FIG. 5 is a flowchart 500 of an exemplary method of operating a wireless terminal using a base station as its point of network attachment in accordance with various embodiments. Operation starts in step 502, where the wireless terminal is powered on and initialized and proceeds to step 504. In step 504, the wireless terminal generates a broadcast signal intended to be detected and used by peer to peer wireless terminals. The generated broadcast signal is, e.g., a single tone OFDM user beacon signal. Other types of broadcast signals can be, and sometimes are, used to communicate peer to peer wireless terminal power control. For example, the signal, in some embodiments, is a multi-tone OFDM signal, e.g., a two or three tone broadcast signal, transmitted at the same power level on each of the tones of the signal. In some embodiments, the signal is an identifiable CDMA reference signal whose received power level can be measured. In some embodiments, the peer to peer power control information is communicated via signal strength. In some embodiments, the peer to peer power control information is communicated via encoded information communicated in the signal. In some embodiments, the peer to peer power control information is communicated via a combination of signal strength and encoded information communicated in the signal. The signal is intended to be used by a peer to peer communications device to control its transmission power level of peer to peer signals into a downlink band. Operation proceeds from step 504 to step 506.

In step 506, the wireless terminal transmits the generated signal in accordance with a predetermined recurring schedule. Operation proceeds from step 506 to step 504.

Figure 6:
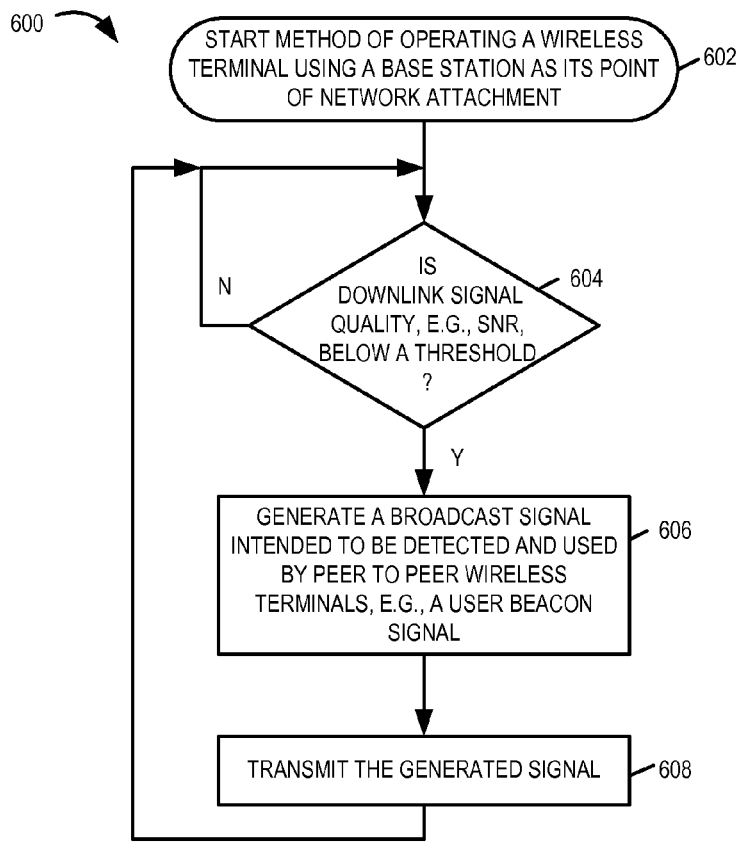
FIG. 6 is a flowchart of an exemplary method of operating a wireless terminal using a base station as its point of network attachment in accordance with various embodiments.

FIG. 6 is a flowchart 600 of an exemplary method of operating a wireless terminal using a base station as its point of network attachment in accordance with various embodiments. FIG. 6 is an alternative implementation to FIG. 5, which has the advantage of less overhead signaling over the airlink on average, but involves a higher level of complexity in the implementation. Operation starts in step 602, where the wireless terminal is powered on and initialized and proceeds to step 604. In step 604, the wireless terminal determines if the downlink signal quality, e.g., received SNR, is below a certain threshold. If the downlink signal quality is not below the threshold then operation returns to the input of step 604; however, if the downlink signal quality is below the threshold then operation proceeds form step 604 to step 606. In step 606, the wireless terminal generates a broadcast signal intended to be detected and used by peer to peer wireless terminals. The generated broadcast signal is, e.g., a single tone OFDM user beacon signal. The signal is intended to be used by a peer to peer communications device to control its transmission power level of peer to peer signals into a downlink band. Operation proceeds from step 606 to step 608.

In step 608, the wireless terminal transmits the generated signal. Operation proceeds from step 608 to step 604.

Figure 7:
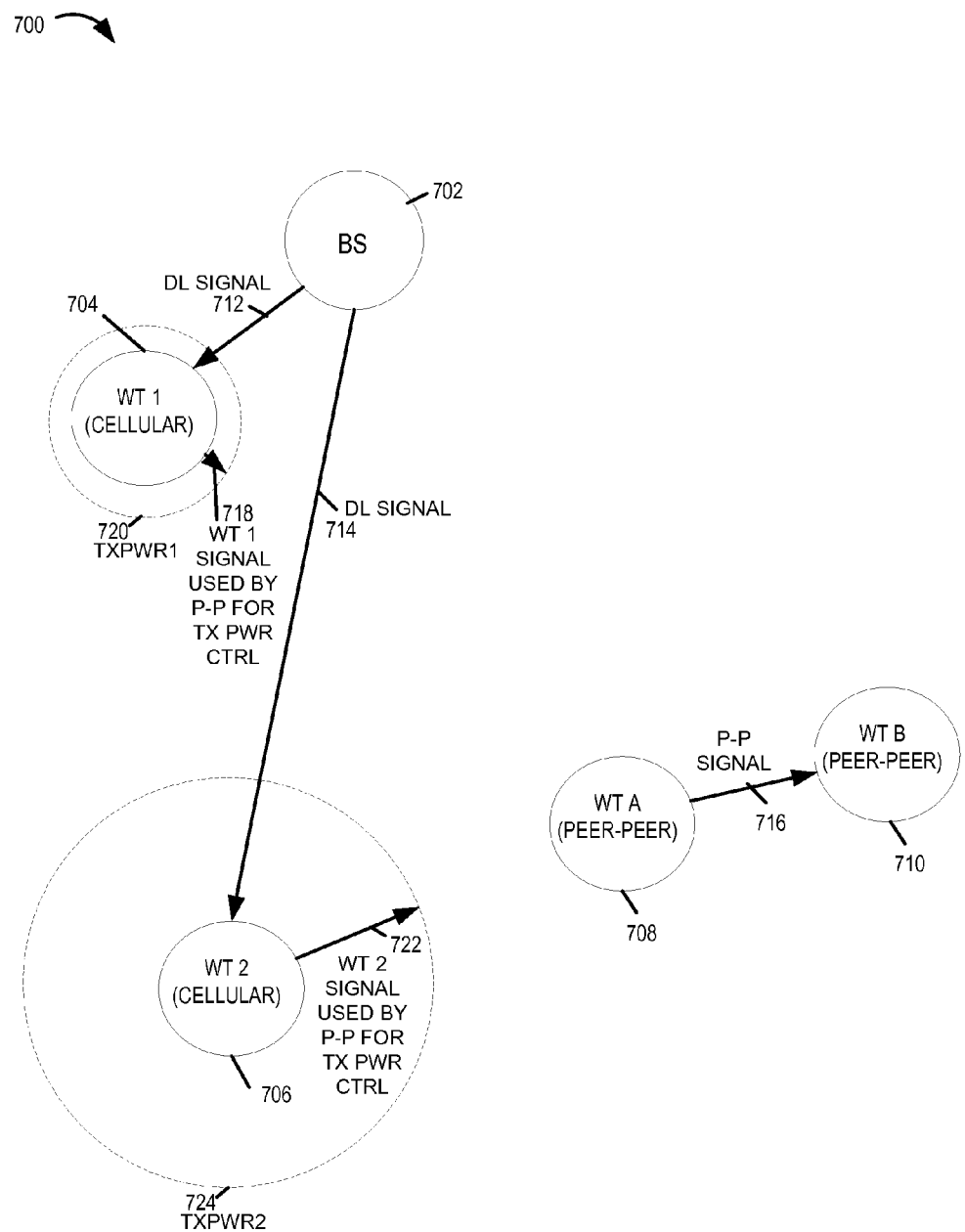
FIG. 7 is a drawing of an exemplary communications system in accordance with various embodiments used to illustrate and describe various features.

FIG. 7 is a drawing of an exemplary communications system 700 in accordance with various embodiments used to illustrate and describe various features. Exemplary communications system 700 includes a base station 702, a plurality of wireless terminals functioning in a cellular mode of operation and using base station 702 as their point of network attachment (WT 1 704, WT 2 706). System 700 also includes a plurality of wireless terminals functioning in a peer to peer mode of operation (wireless terminal A 708, WT B 710). In this exemplary system the downlink bandwidth used for the cellular communications is also utilized by the peer to peer wireless terminals for peer to peer communications.

BS 702 transmits downlink signals which are received by the cellular wireless terminals. Exemplary downlink signal 712 from BS 702 is received by cellular WT 1 704 and exemplary downlink signal 714 from BS 702 is received by cellular WT 2 706. Downlink signals 712 and 714 may be, and sometimes are, the same signal, e.g., a broadcast pilot channel signal. The cellular wireless terminals (704, 706) transmit signals (718, 722), respectively, which can be, and sometimes are, used by peer to peer wireless terminals to control their transmission power levels.

Exemplary signal 718 from cellular wireless terminal 1 704 is transmitted at a lower power level than the transmission power level of signal 722 transmitted by cellular wireless terminal 2 706 as indicated by the smaller size of dotted line circle 720 in comparison to the size of dotted line circle 724. The cellular wireless terminals (704, 706) vary the power of output signals (718, 722), respectively, as a function of the received power from the base station. For example, consider that cellular wireless terminal 1 704 is close to the base station 702 and receives a downlink pilot signal 712 from base station 702 at a high power level and has a high SNR, cellular WT 1 704 transmits a relatively low power signal 718. Also consider that cellular wireless terminal 2 706 is further away from the base station 702 and receives a downlink pilot signal 714 from base station 702 at a lower power level and has a lower SNR, cellular WT 2 706 transmits a relatively high power signal 722.

Peer to peer wireless terminal A 708 receives a cellular wireless terminal transmitted signal, e.g., signal 722, and determines its transmission power as a function of the received signal. For example, the transmission power of peer to peer wireless terminal A is inversely proportional to the received power of signal 722 from cellular WT 2 722 as measured by peer to peer WT A 708. For a peer to peer wireless terminal being influenced by the signal from a cellular wireless terminal, in various embodiments, the following relationship applies: $TXPWR_{Peer-Peer}$ is inversely proportional to $RXPWR_{CELL\_WT\_SIGNAL}$. Thus a peer to peer wireless terminal is allowed to transmit at a higher power level if it receives a lower power level signal from the cellular wireless terminal.

The signal to noise ratio at the cellular wireless terminal will be referred to as $SNR_{mobile}$. The signal to noise ratio at the cellular wireless terminal, in some embodiments, equals the power level of the signal received from the base station divided by the combined interference from the wide area network and the interference from peer to peer wireless terminals. $SNR_{mobile}=P_{from\ BS}/(I_{from\ WAN}+I_{from\ PP})$.

To achieve a desired SNR at the cellular wireless terminal, e.g., mobile, we manage the allowed interference from the peer to peer wireless communications devices and consider what is the allowed level of interference from peer to peer wireless terminals. In this controlled relationship, if the transmission power of the cellular wireless communications device signal, e.g., signal 722, decreases, the interference from the peer to peer communications device can be expected to increase. In addition as the received power of the base station signal measured at the cellular wireless terminal increases the amount of acceptable interference from the peer to peer wireless terminal can be allowed to increase while still meeting the same target SNR at the cellular wireless communications device, e.g., mobile.

If the target SNR at the cellular communications device, $SNR_{mobile}$, increases, the amount of allowed peer to peer interference is controlled to decrease. For example, the target SNR for cellular WT 2 706 increases, and WT 2 706 increases the strength of signal 722 (which would increase the size of circle 724) so that peer to peer WT A 708 will detect a higher received signal strength and in response lower its peer to peer transmission 716 power level, thereby reducing the level of peer to peer interference experienced by cellular wireless terminal 2 706.

Figure 8:
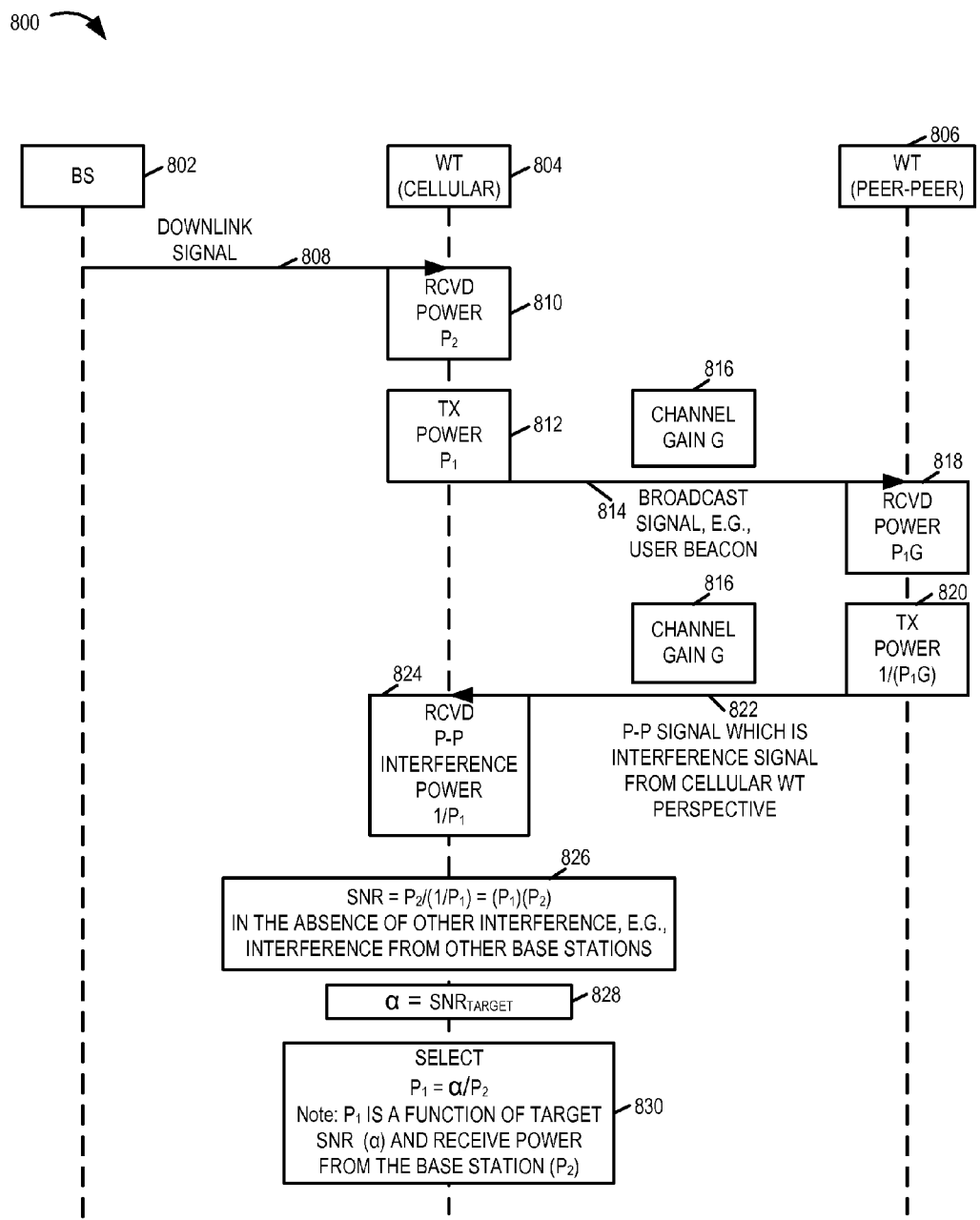
FIG. 8 is a drawing including: exemplary communications devices and exemplary signaling and illustrating exemplary features in accordance with various embodiments.

FIG. 8 is a drawing 800 including exemplary communications devices and exemplary signaling and illustrating exemplary features in accordance with various embodiments. Drawing 800 includes elements of an exemplary wireless communications system including a base station 802, a wireless terminal operating in a cellular mode of operation 804 and a wireless terminal operating in a peer to peer mode of operation 806. A downlink signal 808, transmitted by the base station 802, is received by the cellular wireless terminal 804, which measures the received power of the signal as $P_2$ as indicated by box 810. The cellular wireless terminal 804 sets the transmission power to $P_1$, as indicated by box 812, and transmits power reference broadcast signal 814, e.g., a user beacon signal. The transmitted broadcast signal 814 from the cellular wireless terminal 804 is conveyed via a communications channel with channel gain G 816 to peer to peer wireless terminal 806. The peer to peer wireless terminal 806 receives the power reference signal 814 and measures the received power level, which is $P_1G$, as indicated by box 818. The peer to peer wireless terminal 806 sets its peer to peer transmission power level to $1/(P_1G)$ as indicated by box 820, and transmits peer to peer signal 822. The peer to peer signal 822, which is an interference signal from the perspective of cellular wireless terminal 804, is conveyed by the communications channel having gain G 816 and is received by cellular wireless terminal 804. The received peer to peer interference power corresponding to signal 822 is $1/P_1$ as indicated by block 824.

In block 826, it is noted that the received $SNR=P_2/(1/P_1)=(P_1)(P_2)$, in the absence of other interferences, e.g., in the absence of interference from other base stations. In block 828, we introduce the concept of the cellular wireless terminal having a target SNR, where $\alpha=SNR_{target}$ in the cellular wireless terminal 804. In block 830, we note that by selecting the transmission power of the transmission power reference signal 814 in accordance with $P_1=\alpha/P_2$, the desired SNR will match the target SNR. Note that P1 is a function of the target SNR ($\alpha$) and receive power from the base station ($P_2$).

Note that in a system where the interference contribution from the wide area network, e.g., cellular network, is not insignificant in comparison to the peer to peer interference with respect to the received SNR at the cellular wireless terminal, the received signal to noise ratio at the cellular wireless terminal is equal to the received power from the base station signal divided by the combination of the interference from the peer to peer signaling and the interference from the wide area network, e.g., from other base stations' downlink signaling. $SNR_{cellular\_WT}=P_{from\ BS}/(I_{from\ PP}+I_{from\ WAN})$. In the case, where $I_{from\ PP} \gg I_{from\ WAN}$, the equation becomes: $SNR_{cellular\_WT}=P_{from\ BS}/I_{from\ PP}$. Using the notation of FIG. 8, SNR=$P_2/(1/P_1)$=$P_1P_2$. If we desire target SNR a to equal the received SNR, then we chooses $P_1=\alpha/P_2$.

Figure 9:
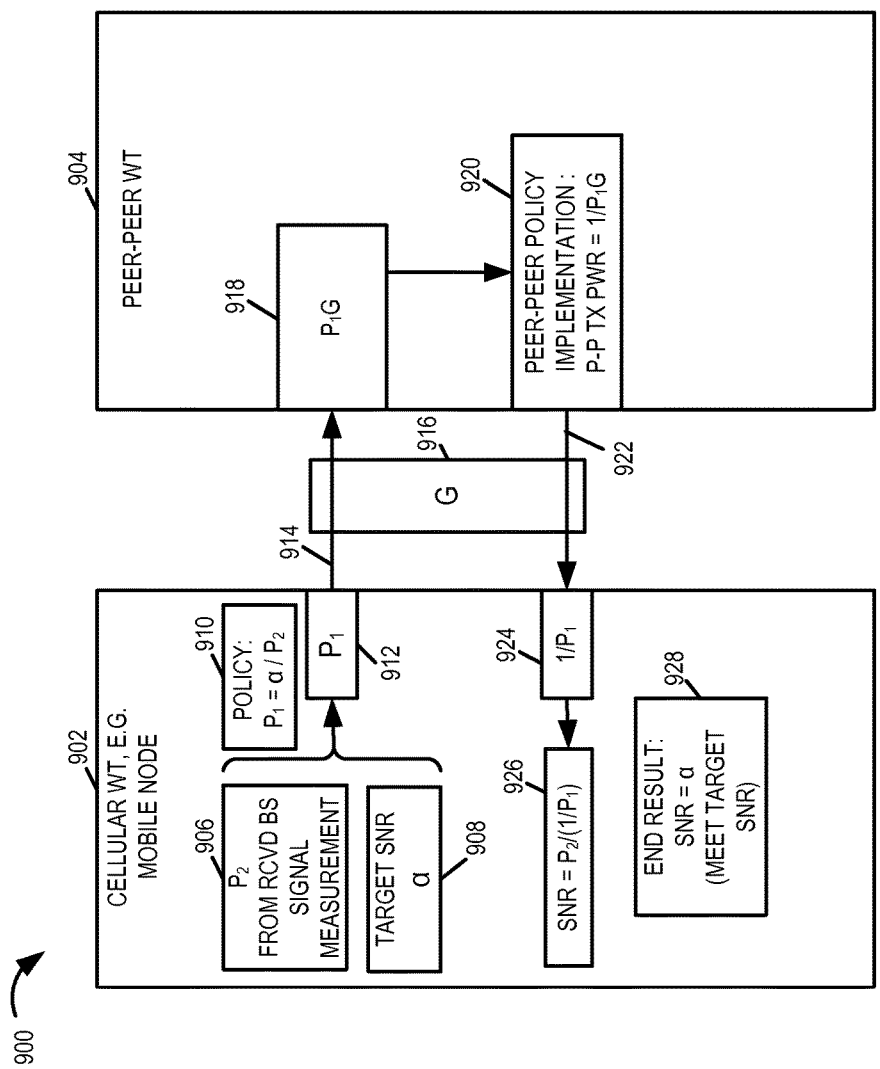
FIG. 9 is a drawing including: exemplary communications devices and exemplary signaling and illustrating exemplary features in accordance with various embodiments.

FIG. 9 is a drawing 900 including exemplary communications devices and exemplary signaling and illustrating exemplary features in accordance with various embodiments. Drawing 900 includes cellular wireless terminal 902, e.g., a mobile node and peer to peer wireless terminal 904. Cellular wireless terminal 902 is, e.g., cellular WT 804 of FIG. 8, and peer to peer wireless terminal 904 is, e.g., peer to peer wireless terminal 806 of FIG. 8.

Cellular wireless terminal 902 measures a received downlink signal from its current serving base station to have a received power level $P_2$ as indicated by block 906. The cellular wireless terminal 902 also has a target receive SNR, a, as indicated by block 908. Cellular wireless terminal 902 implements a policy of generating a power reference signal having a transmit power $P_1$, where $P_1=\alpha/P_2$, as indicated by block 910. The power reference signal 914 is transmitted by cellular wireless terminal 902 at transmit power level $P_1$, as indicated by block 912, subjected to a communications channel with gain G 916 and is received by the peer to peer wireless terminal 904, which measures the received power as $P_1G$ as indicated by block 918. The peer to peer wireless terminal 904 has a policy implementation that sets its peer to peer transmission power to the reciprocal of the received power level, Peer to Peer TX PWR=$1/P_1G$ as indicated by block 920. Peer to peer wireless terminal 904 transmits a peer to peer signal to another peer to peer node at the transmission power level $1/P_1G$; however, this signal is considered to be an interference signal from the perspective of the cellular wireless terminal 902. Signal 922 transmitted at power level $1/P_1G$ is communicated via the communications channel with gain G 916 and is received by the cellular wireless terminal 902 at a power level $1/P_1$ as peer to peer interference as indicated by block 924. The cellular wireless terminal 902 determines a received SNR wherein the signal of interest is from the base station, such that SNR=$P_2/(1/P_1)$ as indicated by box 926. The end result as indicated by box 928 is that the received SNR=the target SNR, a, indicating that the target SNR is met.

Figure 10:
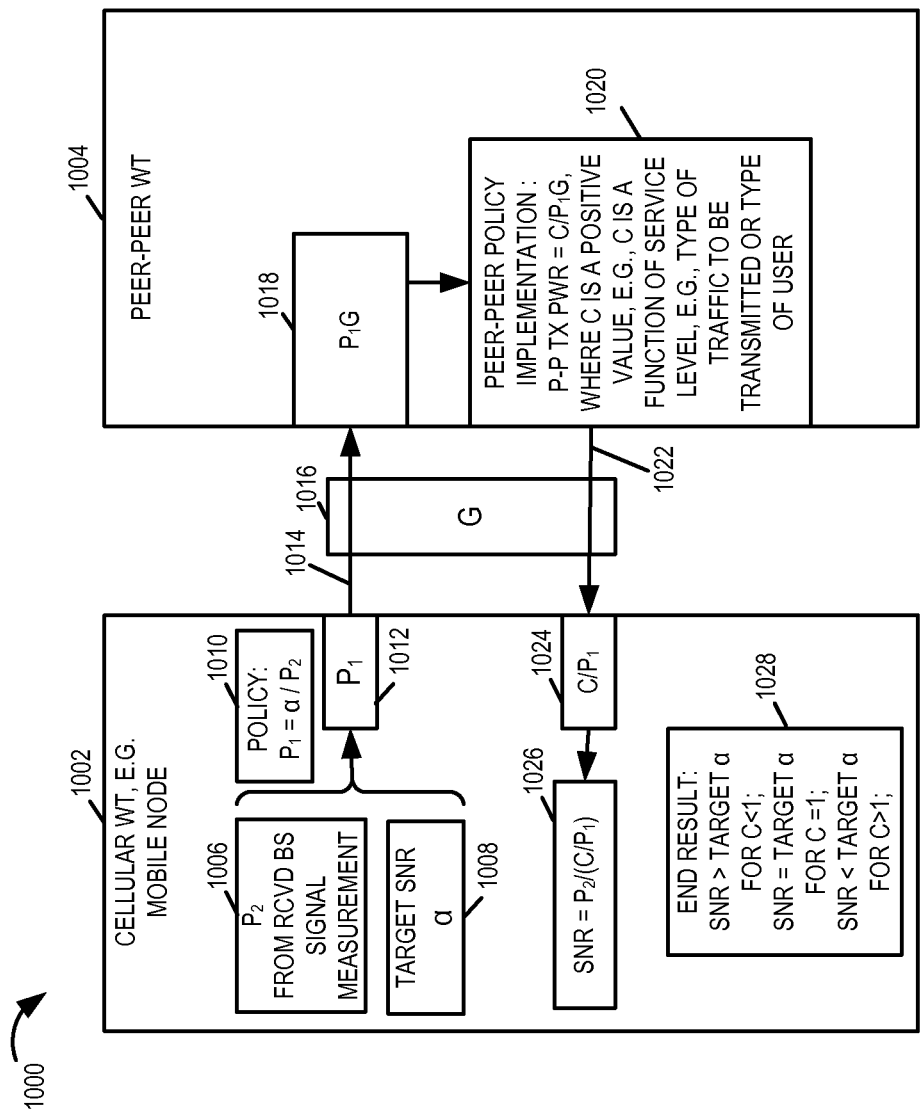
FIG. 10 is a drawing including: exemplary communications devices and exemplary signaling and illustrating exemplary features in accordance with various embodiments.

FIG. 10 is a drawing 1000 including exemplary communications devices and exemplary signaling and illustrating exemplary features in accordance with various embodiments. FIG. 10 is a variation of the implementation of FIG. 9, wherein the peer to peer policy implementation has been changed. Drawing 1000 includes cellular wireless terminal 1002, e.g., a mobile node, and peer to peer wireless terminal 1004.

Cellular wireless terminal 1002 measures a received downlink signal from its current serving base station to have a received power level $P_2$ as indicated by block 1006. The cellular wireless terminal 1002 also has a target receive SNR, a, as indicated by block 1008. Cellular wireless terminal 1002 implements a policy of generating a power reference signal having a transmit power $P_1$, where $P_1=\alpha/P_2$, as indicated by block 1010. The power reference signal 1014 is transmitted by cellular wireless terminal 1002 at transmit power level $P_1$, as indicated by block 1012, subjected to a communications channel with gain G 1016 and is received by the peer to peer wireless terminal 1004, which measures the received power as $P_1G$ as indicated by block 1018.

The peer to peer wireless terminal 1004 has a policy implementation that sets its peer to peer transmission power to a constant C multiplied by the reciprocal of the received power level, Peer to Peer TX PWR=$C/P_1G$, where C is a constant value, as indicated by block 1020. In various embodiments, C is a function of service level, e.g., a type of traffic to be communicated and/or a type of user. Different types of traffic include, e.g., voice, delay sensitive data, and relatively delay insensitive data. Different types of users include, e.g., emergency service users, police personnel, fire department personnel, governmental users, administrative users, commercial users subscribing to a first level, and commercial users subscribing to a second level, said second level being different from said first level in at least one of throughput and delay sensitivity considerations.

Peer to peer wireless terminal 1004 transmits a peer to peer signal to another peer to peer node at the transmission power level $C/P_1G$; however, this signal is considered to be an interference signal from the perspective of the cellular wireless terminal 1002. Signal 1022 transmitted at power level $C/P_1G$ is communicated via the communications channel with gain G 1016 and is received by the cellular wireless terminal 1002 at a power level $C/P_1$ as peer to peer interference as indicated by block 1024. The cellular wireless terminal 1002 determines a received SNR wherein the signal of interest is from the base station, such that SNR=$P_2/(C/P_1)$ as indicated by box 1026. The end results as indicated by box 1028 are: (i) the received SNR>the target SNR α for C<1; (ii) the received SNR=the target SNR α for C=1; and (iii) the received SNR<the target SNR α for C>1. In the case with C<1, the peer to peer transmission levels have been set to reduced levels which should provide additional margin for the cellular wireless terminal. In the case with C>1, the peer to peer transmission levels have been set to increased levels which can override the cellular wireless communications. An example of such a case is where emergency services is using the peer to peer communications and sets C to a value >1 to increase the likelihood that its peer to peer signaling will be successful, to the detriment of the cellular communications which may be occurring concurrently using the same downlink frequency band, thus cellular wireless terminal 1002 may not be able to successfully recover some or all of the downlink data under such conditions.

In various embodiments, the transmission power level of the power reference signal from the cellular wireless terminal $P_1$ is such that $P_1$=function ($P_2$, α), where $P_2$ is the received signal power of a signal from the base station and α is a received target SNR for the cellular wireless terminal. In various embodiments, the function is such that as $P_2$ increases $P_1$ decreases. In various embodiments, the function is such that as $P_2$ decreases $P_1$ increases. In various embodiments, the function is such that as a increases, $P_1$ increases. In some embodiments the target SNR, α=function ($P_2/I_{from\ other\ cells}$), where $P_2$ is the received signal power of a signal from the base station and $I_{from\ other\ cells}$ represents interference power from other base stations.

In some embodiments, the cellular wireless terminal selectively transmits a power reference signal to be used by the peer to peer wireless terminals, e.g., it only sends out the signal when its SNR reaches a certain level. This can have the effect of a peer to peer wireless terminal in the vicinity, receiving the power reference signal and throttling back its transmission power level resulting in a decreased level of peer to peer interference experienced by the cellular wireless communications device which sent out the power reference signal. Thus SNR of the cellular communications device is improved as a result of decreased interference from a peer to peer wireless terminal.

Figure 11:
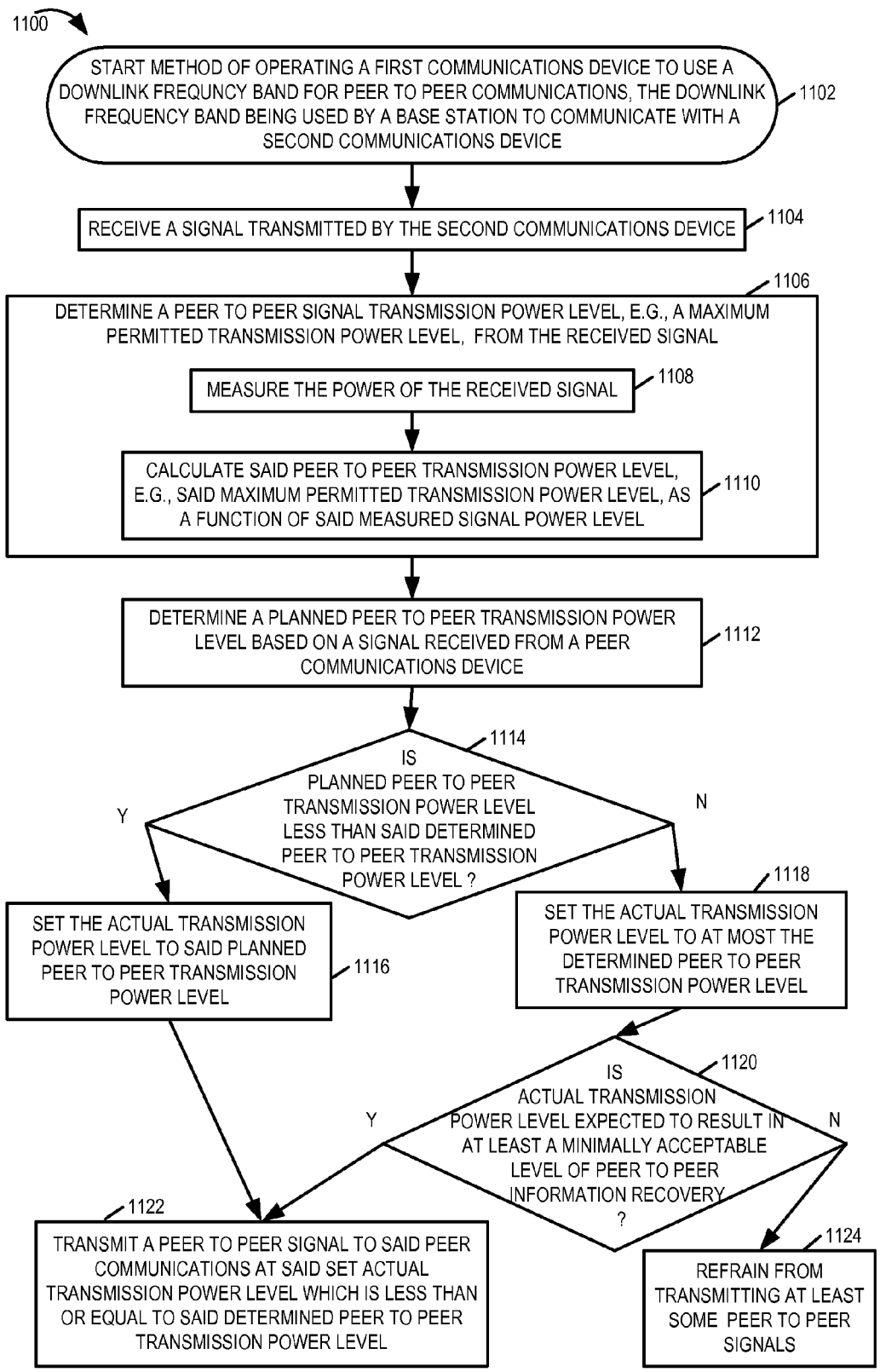
FIG. 11 is a flowchart of an exemplary method of operating a first communications device to use a downlink frequency band for peer to peer communications, the downlink frequency band being used by a base station for communication with a second communications device.

FIG. 11 is a flowchart 1100 of an exemplary method of operating a first communications device to use a downlink frequency band for peer to peer communications, the downlink frequency band being used by a base station for communication with a second communications device. The first communications device is, e.g., a wireless communications device which supports peer to peer communications and may or may not support wide area network, e.g. cellular network, communications. The first communications device is operating in a peer to peer mode of operation. The second communications device is, e.g., a wireless communications device which supports wide area network, e.g., cellular network, communications and may or may not support peer to peer communications. The second communications device is operating in a wide area network, e.g., cellular network, mode of operations.

Operation starts in step 1102, where the first communications device is powered on and initialized, and proceeds to step 1104. In step 1104, the first communications device receives a signal transmitted by the second communications device. In some embodiments the signal received from the second communications device is a signal directed to a base station. In some such embodiments, the signal transmitted to the base station is a control signal transmitted in a recurring time slot. In various embodiments, the signal transmitted by the second communications device is a CDMA pilot signal, e.g., a reverse link pilot signal. In some embodiments, the signal transmitted to the base station is a single tone OFDM signal, e.g., a single tone hopped OFDM signal. In some OFDM embodiments, the signal transmitted to the base station is a dedicated control channel signal.

In various embodiments, the signal received from the second communications device is a broadcast power reference signal. In some embodiments, the broadcast power reference signal is used by both the base station and communications devices operating in a peer to peer mode of operation. In some embodiments, the broadcast power reference signal is intended to be used by communications devices operating in a peer to peer mode of operation, but is not intended to be used by the base station. In some embodiments, the signal received from the second communications device is a signal which has been transmitted in a recurring time slot while the second communications device is communicating with the base station. In some embodiments, the signal received from the second communications device is a signal which is transmitted by said second communications device in response to a condition, e.g., the signal is transmitted when received SNR at the second communications device falls below an acceptable level. In some embodiments, the transmitted signal is being transmitted to try to reduce peer to peer transmission interference levels being experienced by the second communications device.

Operation proceeds from step 1104 to step 1106. In step 1106, the first communications device determines a peer to peer signal transmission power level, e.g., a maximum permitted transmission power level, from the received signal. Step 1106 includes sub-steps 1108 and 1110. In sub-step 1108, the first communications device measures the power of the received signal 1108 and in sub-step 1110, the first communications device calculates said peer to peer signal transmission power level, e.g., said maximum permitted peer to peer signal transmission power level, as a function of said measured signal power level.

In some embodiments, the function used to calculate the maximum transmission power level depends on a service level corresponding to the first communications device. In some such embodiments, when the first communications device corresponds to an emergency service level said function produces a higher transmission power level than when the first communications device corresponds to a non-emergency service level.

In some embodiments, the function used to calculate the maximum transmission power level produces a lower maximum transmission power for a higher measured signal power level than for a lower measured signal power level. In some embodiments, the function calculates a first maximum transmission power level when the measured signal power is a first value and a second maximum transmission power level which is higher than the first maximum transmission power level when the measured signal power is a second value which is lower than the first value.

In various embodiments, the calculated maximum transmission power level is inversely proportional to the measured signal power level, e.g., for at least a range of measured signal power levels with other inputs/control conditions used in the function being constant.

Operation proceeds from step 1106 to step 1112. In step 1112, the first communications device determines a planned peer to peer transmission power level based on a signal received from a peer communications device. For example, in some embodiments, the first communications device determines a value it would like to use for peer to peer transmission if it did not have to take into account interference control considerations of the WAN. Operation proceeds from step 1112 to step 1114. In step 1114, the first communications device determines whether or not the planned peer to peer transmission power level is less than the determined peer to peer transmission power level. If the planned peer to peer transmission power level is less than the determined peer to peer transmission power level, e.g., the maximum permitted peer to peer transmission power level, then operation proceeds from step 1114 to step 1116; otherwise, operation proceeds from step 1114 to step 1118.

In step 1116, the first communications device sets the actual transmission power level to the planned transmission power level. Operation proceeds from step 1116 to step 1122.

Returning to step 1118, in step 1118, the first communications device sets the actual transmission power level to at most the determined peer to peer transmission power level. Operation proceeds from step 1118 to step 1120. In step 1120, the first communications devices checks to determine if the actual transmission power level is expected to result in at least a minimally acceptable level of peer to peer information recovery. If the determination of step 1120 is that the actual transmission power level is expected to achieve at least minimally satisfactory peer to peer information recovery, then operation proceeds from step 1120 to step 1122; otherwise, operation proceeds to step 1124, where the first communications device is operated to refrain from at least some peer to peer signals. In some embodiments, the first communications device refrains from transmitting any peer to peer signal for a period of time, thus removing any peer to peer interference generated from the first communications device during that period of time. In some embodiments, the first communications device refrains from transmitting certain types of peer to peer signals for a period of time while continuing to transmit other types of signals. For example, the first communications device may be controlled to refrain from transmitting traffic signals but may be allowed to transmit user beacon signals.

Returning to step 1122, in step 1122 the first communications device transmits a peer to peer signal to said peer communications device at said actual transmission power level, from step 1116 or step 1118, which is less than or equal to said determined peer to peer transmission power level of step 1106.

Figure 12:
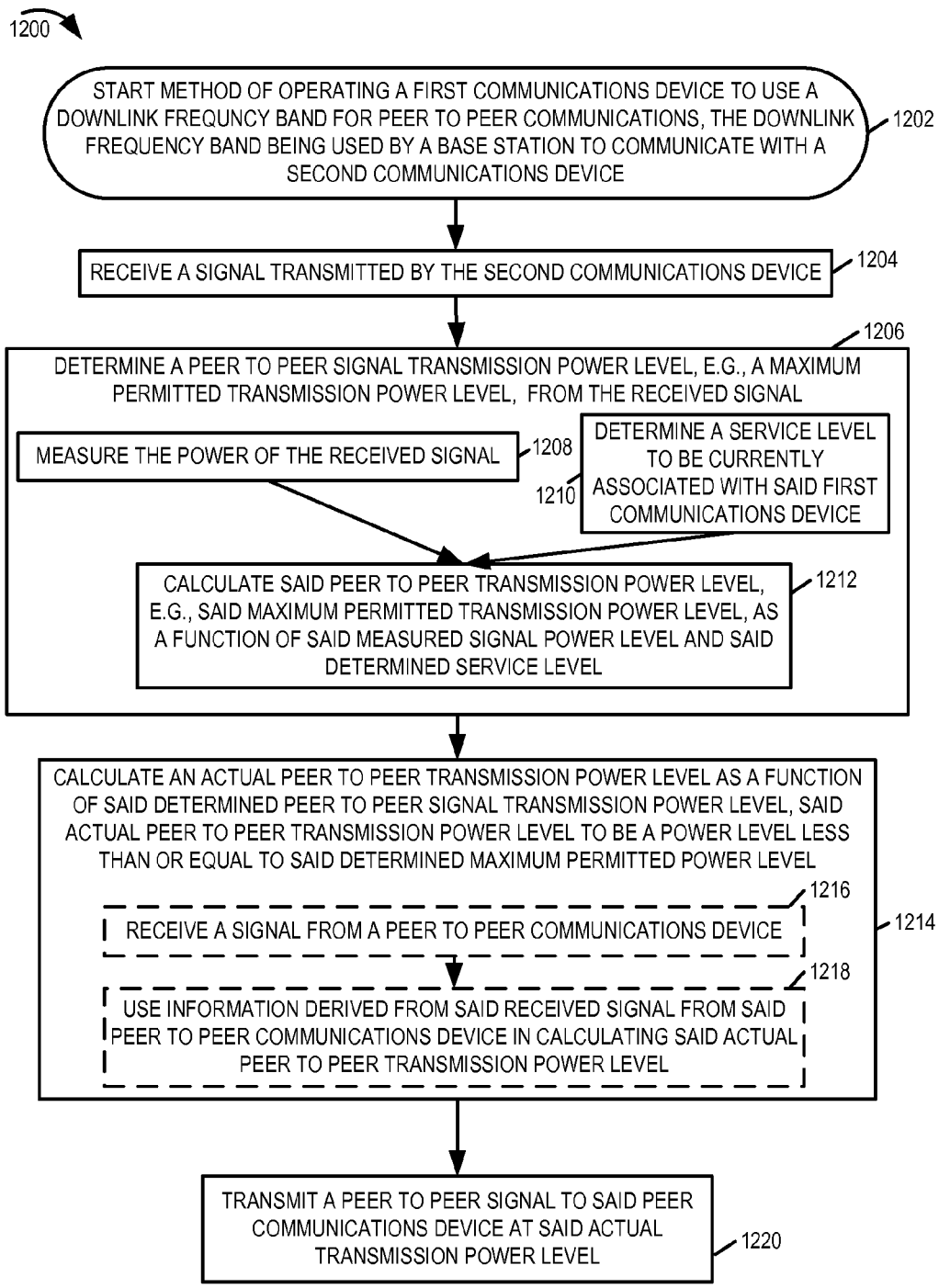
FIG. 12 is a flowchart of an exemplary method of operating a first communications device to use a downlink frequency band for peer to peer communications, the downlink frequency band being used by a base station for communication with a second communications device.

FIG. 12 is a flowchart 1200 of an exemplary method of operating a first communications device to use a downlink frequency band for peer to peer communications, the downlink frequency band being used by a base station for communication with a second communications device. The first communications device is, e.g., a wireless communications device which supports peer to peer communications and may or may not support wide area network, e.g. cellular network, communications. The first communications device is operating in a peer to peer mode of operation. The second communications device is, e.g., a wireless communications device which supports wide area network, e.g., cellular network, communications and may or may not support peer to peer communications. The second communications device is operating in a wide area network, e.g., cellular network, mode of operation.

Operation starts in step 1202, where the first communications device is powered on and initialized, and proceeds to step 1204. In step 1204, the first communications device receives a signal transmitted by the second communications device. In some embodiments the signal received from the second communications device is a signal directed to a base station. In some such embodiments, the signal transmitted to the base station is a control signal transmitted in a recurring time slot. In various embodiments, the signal transmitted by the second communications device is a CDMA pilot signal, e.g., a reverse link pilot signal. In some embodiments, the signal transmitted to the base station is a single tone OFDM signal, e.g., a single tone hopped OFDM signal. In some OFDM embodiments, the signal transmitted to the base station is a dedicated control channel signal.

In various embodiments, the signal received from the second communications device is a broadcast power reference signal. In some embodiments, the broadcast power reference signal is used by both the base station and communications devices operating in a peer to peer mode of operation. In some embodiments, the broadcast power reference signal is intended to be used by communications devices operating in a peer to peer mode of operation, but is not intended to be used by the base station. In some embodiments, the signal received from the second communications device is a signal which has been transmitted in a recurring time slot while the second communications device is communicating with the base station. In some embodiments, the signal received from the second communications device is a signal which is transmitted by said second communications device in response to a condition, e.g., the signal is transmitted when received SNR at the second communications device falls below an acceptable level. In some embodiments, the transmitted signal is being transmitted to try to reduce peer to peer transmission interference levels being experienced by the second communications device.

Operation proceeds from step 1204 to step 1206. In step 1206, the first communications device determines a peer to peer signal transmission power level, e.g., a maximum permitted transmission power level, from the received signal. Step 1206 includes sub-steps 1208, 1210 and 1212. In sub-step 1208, the first communications device measures the power of the received signal from step 1204, and in sub-step 1210 the first communications device determines a service level to be currently associated with said first communications device. In some embodiments, the service level is a function of at least one of a type of traffic to be communicated and a type of user. Different types of traffic include, e.g., voice, delay sensitive data, and relatively delay insensitive data. Different types of users include, e.g., emergency service users such as police, fire and government agency affiliated users, network provider users, first level commercial users and second level commercial users. In some such embodiments, first and second commercial level users correspond to different purchased service plans with the different purchased service plans differing in at least one of data throughput specifications and latency specifications. Operation proceeds from sub-steps 1208 and 1210 to sub-step 1212. In sub-step 1212, the first communications device calculates said peer to peer signal transmission power level, e.g., said maximum permitted peer to peer signal transmission power level, as a function of said measured signal power level and said determined service level. In some such embodiments, when the first communications device corresponds to an emergency service level said calculation produces a higher transmission power level than when the first communications device corresponds to a non-emergency service level.

In some embodiments, the function used to calculate the maximum transmission power level produces a lower maximum transmission power for a higher measured signal power level than for a lower measured signal power level. In some embodiments, the function calculates a first maximum transmission power level when the measured signal power is a first value and a second maximum transmission power level which is higher than the first maximum transmission power level when the measured signal power is a second value which is lower than the first value.

In various embodiments, the calculated maximum transmission power level is over a range inversely proportional to the measured signal power level for at least one service level.

In some embodiments, at least one service level, e.g., a service level corresponding to an emergency service level, can result in peer to peer transmission power levels which can result in peer to peer interference from the first communications device experienced by the second communications device which exceeds a desired level of acceptable interference communicated by the second communications device corresponding to the signal transmitted by the second communications device. Thus in some embodiments, an emergency service level gives preference to the peer to peer communications device at the expense of a wide area network communications device.

In some embodiments, service levels which do not correspond to emergency service levels are calculated to result in a determined maximum permitted peer to peer transmission power level which should result in a level of peer to peer interference from the first wireless communications device experienced at the second communications device which is considered acceptable from the perspective of the second communications device. Thus, in some embodiments, for non-emergency peer to peer communications, preference is given to the wide area network communications devices at the expense of peer to peer communications.

Operation proceeds from step 1206 to step 1214. In step 1214, the first communications device calculates an actual peer to peer transmission power level as a function of said determined peer to peer transmission power level, e.g., a determined maximum peer to peer transmission power level, said actual peer to peer transmission power level being a power level less than or equal to said determined maximum permitted power level. In various embodiments, step 1214 includes sub-step 1216 and 1218. In sub-step 1216, the first communications device receives a signal from a peer to peer communications device, and then in sub-step 1218 the first communications device uses information derived from said received signal from said peer to peer communications device in calculating said actual peer to peer transmission power level. Information derived from said received signal from the peer to peer communications device includes power information, channel condition information, data rate information, position information and/or distance information. Operation proceeds from step 1214 to step 1220.

In step 1220, the first communications device transmits a peer to peer signal to said peer communications device at said actual peer to peer transmission power level.

In some embodiments, calculating a maximum transmitted peer to peer power level may, and sometimes does, include determining that the maximum transmitted peer to peer transmitted power is to be zero, in which case steps 1214 and 1220 are not performed. In some embodiments, calculating an actual transmitted peer to peer power level may, and sometimes does, include determining that the actual power level is to be zero, in which case step 1220 is not performed.

Figure 13:
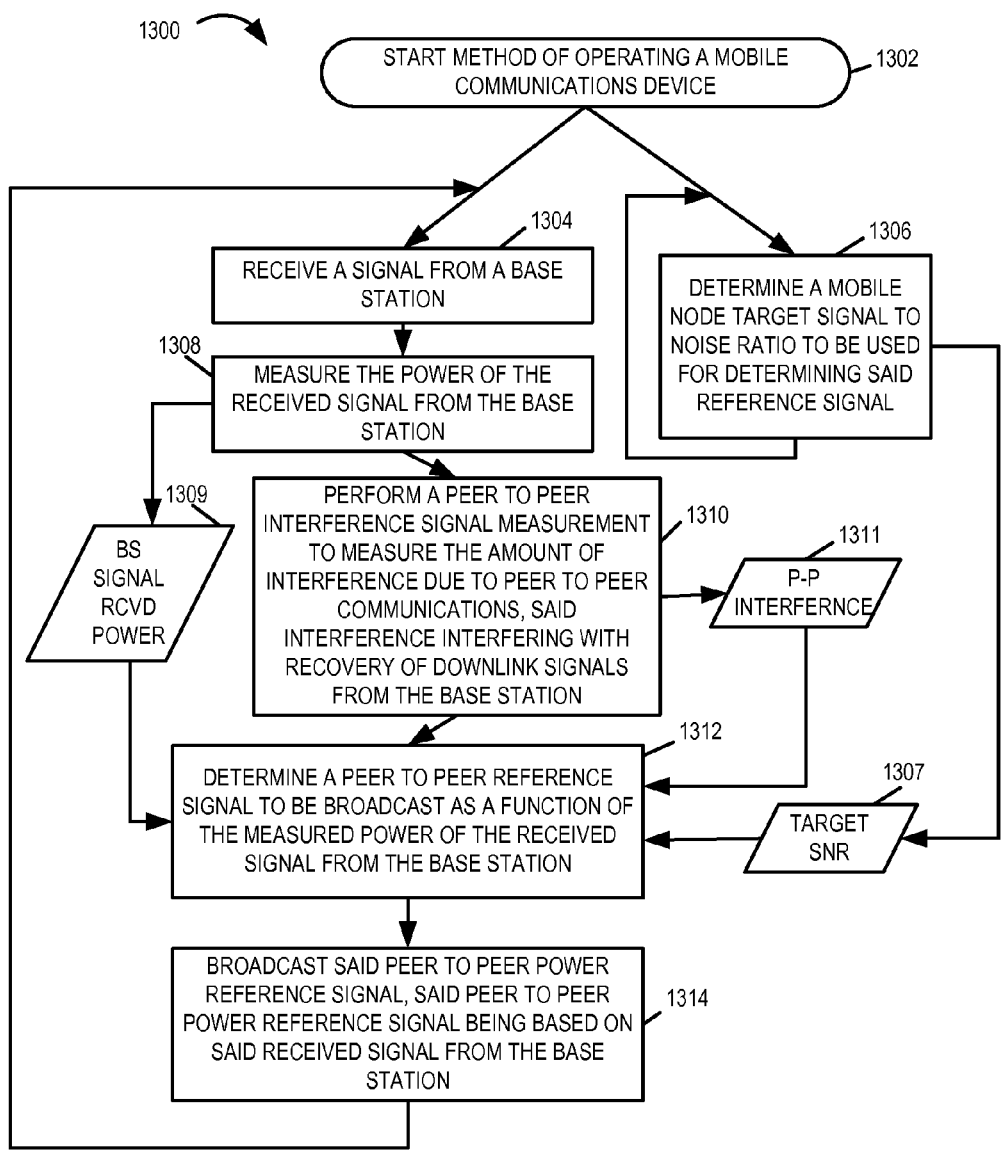
FIG. 13 is a flowchart of an exemplary method of operating a mobile communications device, e.g., a mobile node supporting cellular communications, in accordance with various embodiments.

FIG. 13 is a flowchart 1300 of an exemplary method of operating a mobile communications device, e.g., a mobile node supporting cellular communications, in accordance with various embodiments. Operation starts in step 1302, where the mobile communications device is powered on and initialized. Operation proceeds from start step 1302 to steps 1304 and step 1306.

In step 1304, the mobile communications device receives a signal from a base station, and then in step 1308, the mobile communications device measures the power of the received signal from the base station obtaining base station received power information 1309. Operation proceeds from step 1308 to step 1310. In step 1310, the mobile communications device performs a peer to peer interference signal measurement to measure the amount of interference due to peer to peer communications, the interference affecting recovery of downlink signals from the base station. Peer to peer interference information 1311 is an output of step 1310.

Returning to step 1306, in step 1306, which is performed on an ongoing basis, the mobile communications device determines a mobile node target signal to noise ratio to be used for determining a peer to peer power reference signal. Target SNR 1307 is an output of step 1306.

Returning to step 1310, operation proceeds from step 1310 to step 1312. In step 1312, the mobile communications device determines a peer to peer reference signal to be broadcast as a function of the measured power of the received signal 1309. The determination of the peer to peer reference signal, in this embodiment, is also a function of the peer to peer interference 1311 and the target SNR 1307. Operation proceeds from step 1312 to step 1314. In step 1314, the mobile communications device broadcasts the peer to peer power reference signal, said peer to peer power reference signal being based on the received signal from the base station. Operation proceeds from step 1314 to step 1304, where the mobile communications device receives another signal from the base station.

Figure 14:
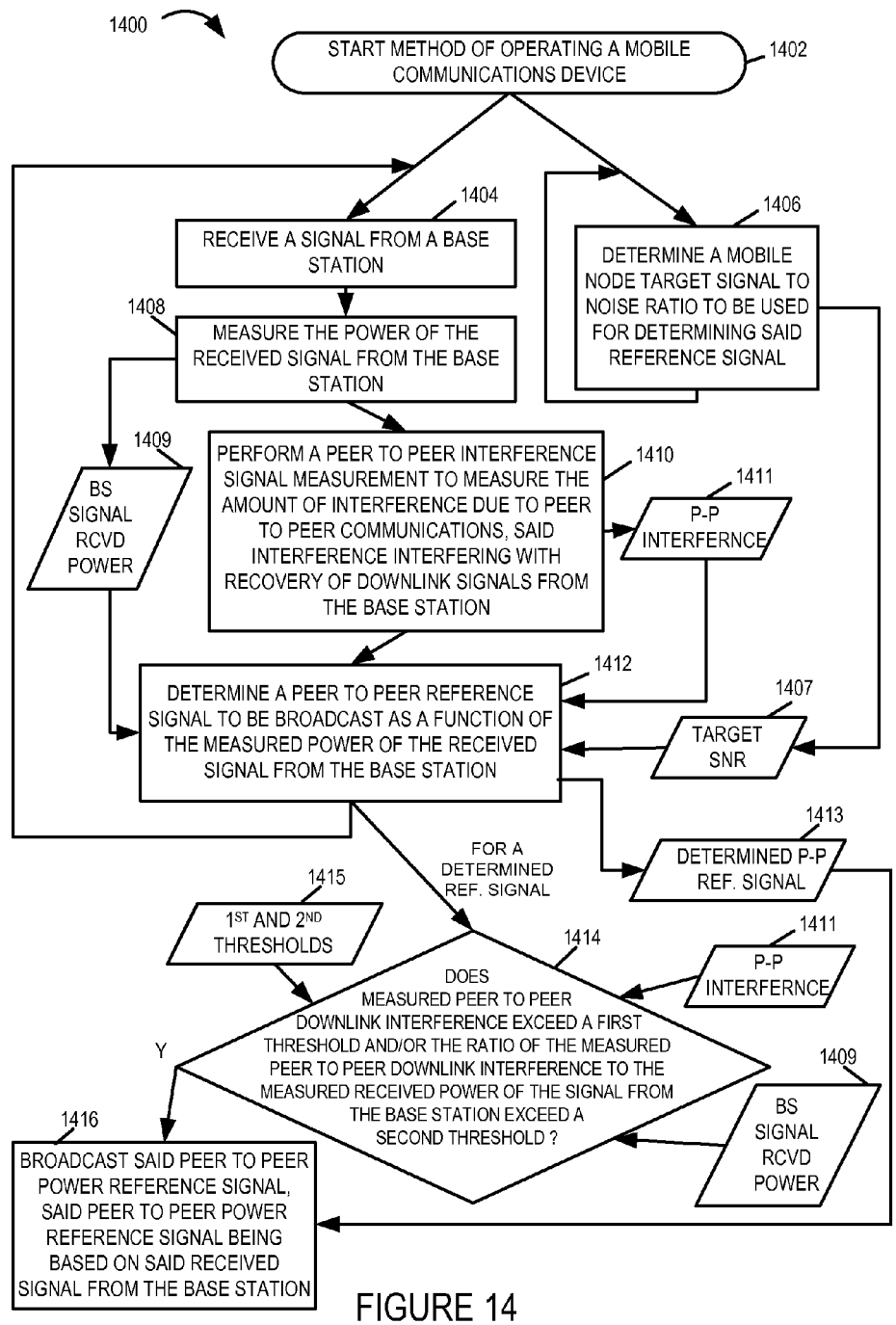
FIG. 14 is a flowchart of an exemplary method of operating a mobile communications device, e.g., a mobile node supporting cellular communications, in accordance with various embodiments.

FIG. 14 is a flowchart 1400 of an exemplary method of operating a mobile communications device, e.g., a mobile node supporting cellular communications, in accordance with various embodiments. Operation starts in step 1402, where the mobile communications device is powered on and initialized. Operation proceeds from start step 1402 to steps 1404 and step 1406.

In step 1404, the mobile communications device receives a signal from a base station, and then in step 1408, the mobile communications device measures the power of the received signal from the base station obtaining base station received power information 1409. Operation proceeds from step 1408 to step 1410. In step 1410, the mobile communications device performs a peer to peer interference signal measurement to measure the amount of interference due to peer to peer communications, the interference affecting recovery of downlink signals from the base station. Peer to peer interference information 1411 is an output of step 1410.

Returning to step 1406, in step 1406, which is performed on an ongoing basis, the mobile communications device determines a mobile node target signal to noise ratio to be used for determining a peer to peer power reference signal. Target SNR 1407 is an output of step 1406.

Returning to step 1410, operation proceeds from step 1410 to step 1412. In step 1412, the mobile communications device determines a peer to peer reference signal to be broadcast as a function of the measured power of the received signal 1409. The determination of the peer to peer reference signal, in this embodiment, is also a function of the peer to peer interference 1411 and the target SNR 1407. Operation proceeds from step 1412 to step 1404, where the mobile communications device measures another signal from the base station.

Operation also proceeds from step 1412 to step 1414 for a determined peer to peer reference signal. In step 1414, the mobile communications device determines if the measured peer to peer downlink interference exceeds a first threshold and/or the ratio of the measured peer to peer downlink interference to the measured received power of the signal from the base station exceeds a second threshold. $1^{st}$ and $2^{nd}$ thresholds 1415, peer to peer interference 1411 and base station signal received power 1409 are inputs to step 1414. If in step 1414 at least one of the tested thresholds are exceeded, then operation proceeds from step 1414 to step 1416, where the mobile communications device broadcasts the peer to peer power reference signal, said peer to peer power reference signal being based on the received signal from the base station. If in step 1414, it is determined that both of the test conditions do not result in thresholds being exceeded, then the peer to peer power reference signal is not broadcast at this time.

In some embodiments, step 1414 precedes step 1412, with the determination of the peer to peer to peer reference signal and the broadcast of the determined peer to peer reference signal only being performed if one of the tests of step 1414 exceeds a limit.

Figure 15:
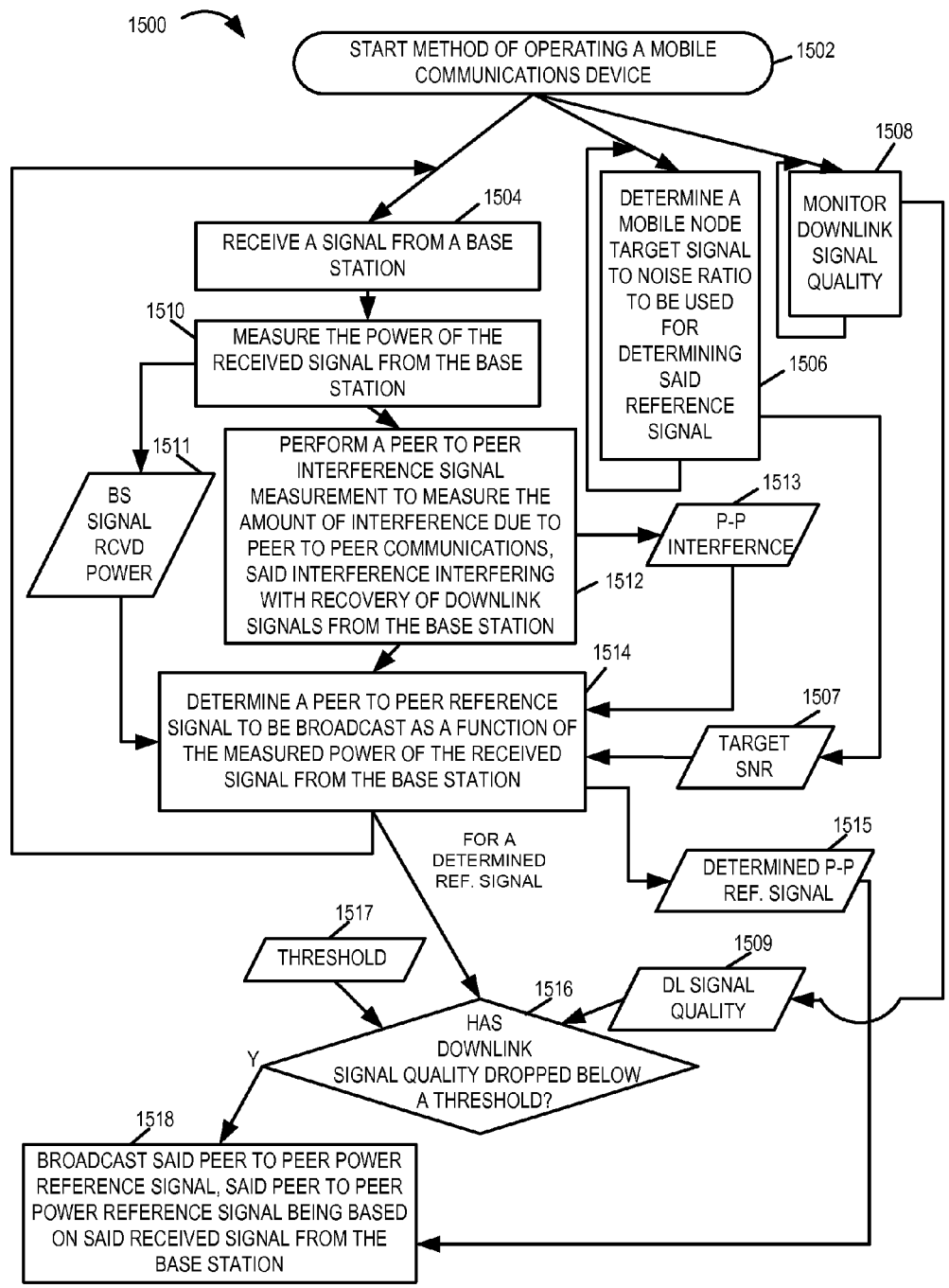
FIG. 15 is a flowchart of an exemplary method of operating a mobile communications device, e.g., a mobile node supporting cellular communications, in accordance with various embodiments.

FIG. 15 is a flowchart 1500 of an exemplary method of operating a mobile communications device, e.g., a mobile node supporting cellular communications, in accordance with various embodiments. Operation starts in step 1502, where the mobile communications device is powered on and initialized. Operation proceeds from start step 1502 to steps 1504, 1506 and 1508.

In step 1506, which is performed on an ongoing basis, the mobile communications device determines a mobile node target signal to noise ratio to be used for determining a peer to peer power reference signal. Target SNR 1507 is an output of step 1506. In step 1508, which is performed on an ongoing basis, the mobile communications device determines downlink signal quality from the perspective of the mobile communications device. Downlink signal quality 1509 is an output of step 1508.

Returning to step 1504, in step 1504, the mobile communications device receives a signal from a base station, and then in step 1510, the mobile communications device measures the power of the received signal from the base station obtaining base station received power information 1511. Operation proceeds from step 1510 to step 1512. In step 1512, the mobile communications device performs a peer to peer interference signal measurement to measure the amount of interference due to peer to peer communications, the interference affecting recovery of downlink signals from the base station. Peer to peer interference information 1513 is an output of step 1512.

Returning to step 1512, operation proceeds from step 1512 to step 1514. In step 1514, the mobile communications device determines a peer to peer reference signal 1515 to be broadcast as a function of the measured powered of the received signal 1511. The determination of the peer to peer reference signal, in this embodiment, is also a function of the peer to peer interference 1513 and the target SNR 1507. Operation proceeds from step 1514 to step 1504, where the mobile communications device measures another signal from the base station.

Operation also proceeds from step 1514 to step 1516 for a determined peer to peer reference signal. In step 1516, the mobile communications device determines if the downlink signal quality has dropped below a threshold. Threshold information 1517 and downlink signal quality 1509 are inputs to step 1516. If in step 1516, the mobile communications device determines that downlink signal quality has dropped below the acceptable threshold, then operation proceeds from step 1516 to step 1518, where the mobile communications device broadcasts the peer to peer power reference signal 1515, said peer to peer power reference signal 1515 being based on the received signal from the base station. If in step 1516, it is determined that downlink signal quality meets or exceeds the threshold, then the peer to peer power reference signal is not broadcast at this time. Thus, the peer to peer power reference signal is selectively broadcast, as needed, to attempt to throttle back transmission power levels of peer to peer devices in the vicinity and thus reduce peer to peer interference being experienced by the receiver of the mobile communications device. When downlink signal quality is considered acceptable from the perspective of the mobile communications device, the mobile communications device does not feel a need to influence ongoing peer to peer operations, and thus does not broadcast a peer to peer power reference signal, thereby eliminating unnecessary overhead signaling and wastage of valuable air link resources.

In some embodiments, step 1506 is moved up in the flowchart, e.g., before one or more of steps 1512 and 1514. For example, in some embodiments, the mobile communications device does not determine or broadcast a peer to peer power reference signal unless downlink signal quality drops below an acceptable threshold.

Figure 16:
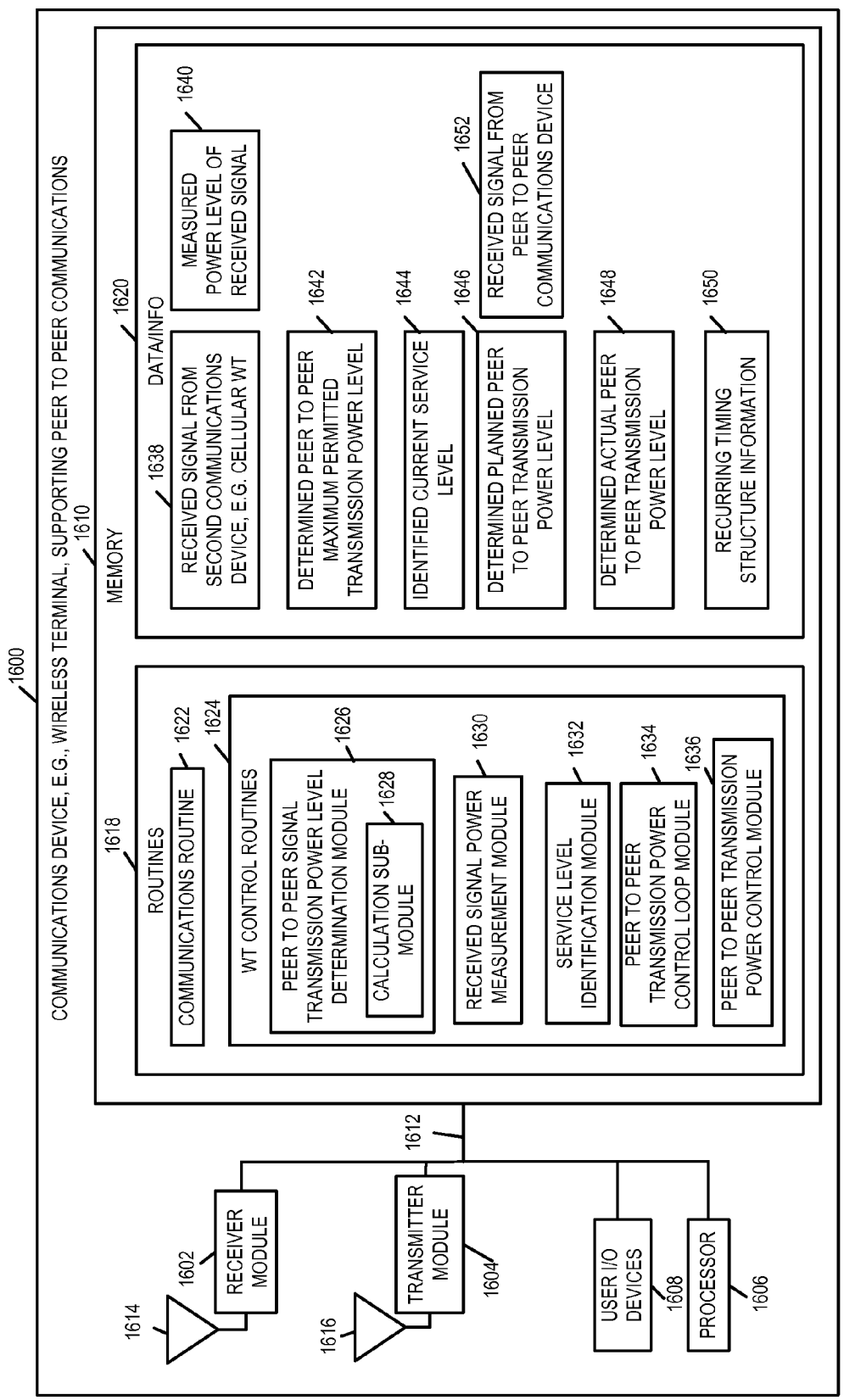
FIG. 16 is a drawing of an exemplary communications device, e.g., a wireless terminal such as a mobile node, supporting peer to peer communications.

FIG. 16 is a drawing of an exemplary communications device 1600, e.g., a wireless terminal such as a mobile node, supporting peer to peer communications. Exemplary wireless communications device 1600 may be a wireless communications device supporting peer to peer communications but not supporting wide area network, e.g., cellular communications. Alternatively, exemplary wireless communication device 1600 may be a wireless communications device supporting both peer to peer communications and wide area network, e.g., cellular communications. Communications device 1600 supports use of a downlink frequency band for peer to peer communications, the downlink frequency band being used by a base station to communicate with a second communications device. In various embodiments, communications device 1600 operates in a TDD mode for peer to peer communications utilizing a base station downlink frequency band, with at least some of the peer to peer signals transmitted by communications device 1600 creating interference from the perspective of a WAN wireless terminal, e.g., a cellular wireless terminal, attempting to recover downlink signals from the base station.

Exemplary communications device 1600 includes a receiver module 1602, a transmitter module 1604, a processor 1606, user I/O devices 1608, and a memory 1610 coupled together via a bus 1612 over which the various elements may interchange data and information. Memory 1610 includes routines 1618 and data/information 1620. The processor 1606, e.g., a CPU, executes the routines 1618 and uses the data/information 1620 in memory 1610 to control the operation of the communications device 1600 and implement methods.

Receiver module 1602, e.g., an OFDM receiver, is coupled to receive antenna 1614 via which the communications device receives signals. Received signals include signals from other peer to peer communications devices, e.g., wireless terminals functioning in a peer to peer mode of operation and signals from WAN communications devices, e.g., wireless terminals functioning in a cellular mode of operation.

Transmitter module 1604, e.g., an OFDM transmitter, is coupled to transmit antenna 1616, via which the communications device 1600 transmits signals. Transmitted signals include signals to peer to peer communications devices. Transmitter module 1604 transmits a peer to peer signal to a peer to peer communications device at an actual power level which is less than or equal to a determined peer to peer maximum permitted transmission power level. In various embodiments, the same antenna or antennas are used for transmitter and receiver.

User I/O devices 1608 include, e.g., microphone, keyboard, keypad, mouse, camera, speaker, display, etc. User I/O devices 1608 enable an operator of communications device 1600 to input data/information, access output data/information, and control at least some functions of the communications device 1600, e.g., initiate a peer to peer communications session.

Routines 1618 include a communications routine 1622 and wireless terminal control routines 1624. The communications routine 1622 implements various communications protocols used by the communications device 1600. The wireless terminal control routines 1624 include a peer to peer signal transmission power level determination module 1626, a received signal power measurement module 1630, a service level identification module 1632, a peer to peer transmission power control loop module 1634, and a peer to peer transmission power control module 1636.

Data/information 1620 includes a received signal from a second communications device 1638, a corresponding measured power level of the received signal 1640, a determined maximum permitted transmission power level 1642, an identified current service level 1644, a determined planned peer to peer transmission power level 1646, a received signal from peer to peer communications device 1652, a determined actual peer to peer transmission power level 1648 and recurring timing structure information 1650.

Peer to peer signal transmission power level determination module 1626 determines a peer to peer signal transmission power level, e.g., a maximum permitted peer to peer transmission power level, from a received signal transmitted by a second communications device, e.g., received signal from second communications device 1638. The second communications device is, e.g., a wireless terminal operating in a cellular mode of operation and receiving downlink signals from a base station in the same communications band being used by communications device 1600 for peer to peer signaling. Determined peer to peer maximum permitted transmission power level 1642 is an output of determination module 1626. Peer to peer signal transmission power level determination module 1626 includes a calculation sub-module 1628. Calculation sub-module 1628 calculates a maximum transmission power level as a function of a measured signal power level, e.g., measured power level of received signal 1640.

Received signal power measurement module 1630 measures the power of a received signal to obtain a measured signal power level. For example, received signal power measurement module 1630 measures the received power of the received signal from the second communications device 1638 obtaining measured power level of received signal 1640 which is used as an input to calculation sub-module 1628. It should be observed that even though communications device 1600 is operating in a peer to peer communications mode, it is receiving and measuring signals from WAN, e.g., cellular communications devices, which are influencing peer to peer transmission power levels.

In some embodiments, the signal received from the second communications device is a signal directed to a base station. The signal directed to the base station is, e.g., a control signal transmitted in a recurring time slot. In some embodiments, the signal directed to the base station is a CDMA pilot signal, e.g., a reverse link pilot signal. In some embodiments, the signal directed to the base station is a single tone hopped OFDM signal, e.g., a dedicated control channel signal.

In some embodiments, the signal received from the second communications device is a broadcast power reference signal. In some such embodiments, the broadcast power reference signal is intentionally generated and transmitted for the purpose of controlling interference from peer to peer wireless terminals which may be in the vicinity of the second communications device and may generate peer to peer transmissions which interfere with reception and recovery of downlink signals from a base station by the second communications device.

Service level identification module 1632 identifies a current service level corresponding to the communications device 1600. Identified current service level 1644 represents an output of service level identification module 1632. In various embodiments, the function used to calculate the maximum transmission power level depends on the service level corresponding to the first communications device 1600.

In some embodiments, when the identified service level corresponds to an emergency service level the function used for determining the maximum transmission power level produces a higher maximum transmission power level than when the service level corresponds to a non-emergency service, for at least one set of input variables used by said function, e.g., for the same measured power level of the received signal.

Peer to peer transmission power control loop module 1634 determines a planned peer to peer transmission power level based on a signal received from a peer communications device, e.g. received signal from peer to peer communications device 1652. The peer to peer communications device, which transmitted the received signal, is, e.g., a communications device with which communications device 1600 has or would like to have an ongoing peer to peer communications session. Determined planned peer to peer transmission power level 1646 is an output of module 1634. In some embodiments, the determined planned peer to peer transmission power level 1646 is the peer to peer transmission power level that communications device 1600 would like to use, and would use, is if was not being influenced by interference considerations with respect to WAN wireless terminals attempting to recover downlink signals from a base station.

Peer to peer transmission power control module 1636 sets the actual peer to peer transmission power level 1648 to the planned transmission power level when the planned peer to peer transmission power level is less than the determined maximum permitted peer to peer transmission power level. In some embodiments, the peer to peer transmission power control module 1636 sets the actual peer to peer transmission power level 1648 to the maximum permitted peer to peer transmission power level when the planned peer to peer transmission power level is greater than or equal to the determined maximum permitted peer to peer transmission power level. In some such embodiments, the setting is conditional upon the communications device 1600 estimating that the peer to peer communications device to which the peer to peer signal is to be directed has an acceptable estimated probability of successfully decoding and recovering the signal if transmitted at the maximum permitted peer to peer transmission power level. In some such embodiments, if the estimated probability of a successful decode and recovery is unacceptable, then the communications device 1600 refrains from transmitting the peer to peer signal.

In various embodiments, the function used for determining a peer to peer transmission power level, e.g., a maximum permitted peer to peer transmission power level, produces a lower maximum transmission power level for a higher measured signal power level than for a lower measured signal power level. For example, the output vs input characteristic curve for the function has a negative slope value for at least a portion of the input range. In some such embodiments, the curve flattens, e.g., saturates, at one or both ends.

In various embodiments, the function used for determining a peer to peer transmission power level, e.g., a maximum permitted peer to peer transmission power level, calculates a first maximum transmission power level when said measured power is a first value and a second maximum transmission power level which is higher than said first maximum transmission power level when said measured signal is a second value which is lower than said first value.

In some embodiments, the function used for determining a peer to peer transmission power level, e.g., a maximum permitted peer to peer transmission power level, is inversely proportional to the measured signal power level for a range of measured signal power levels.

Figure 17:
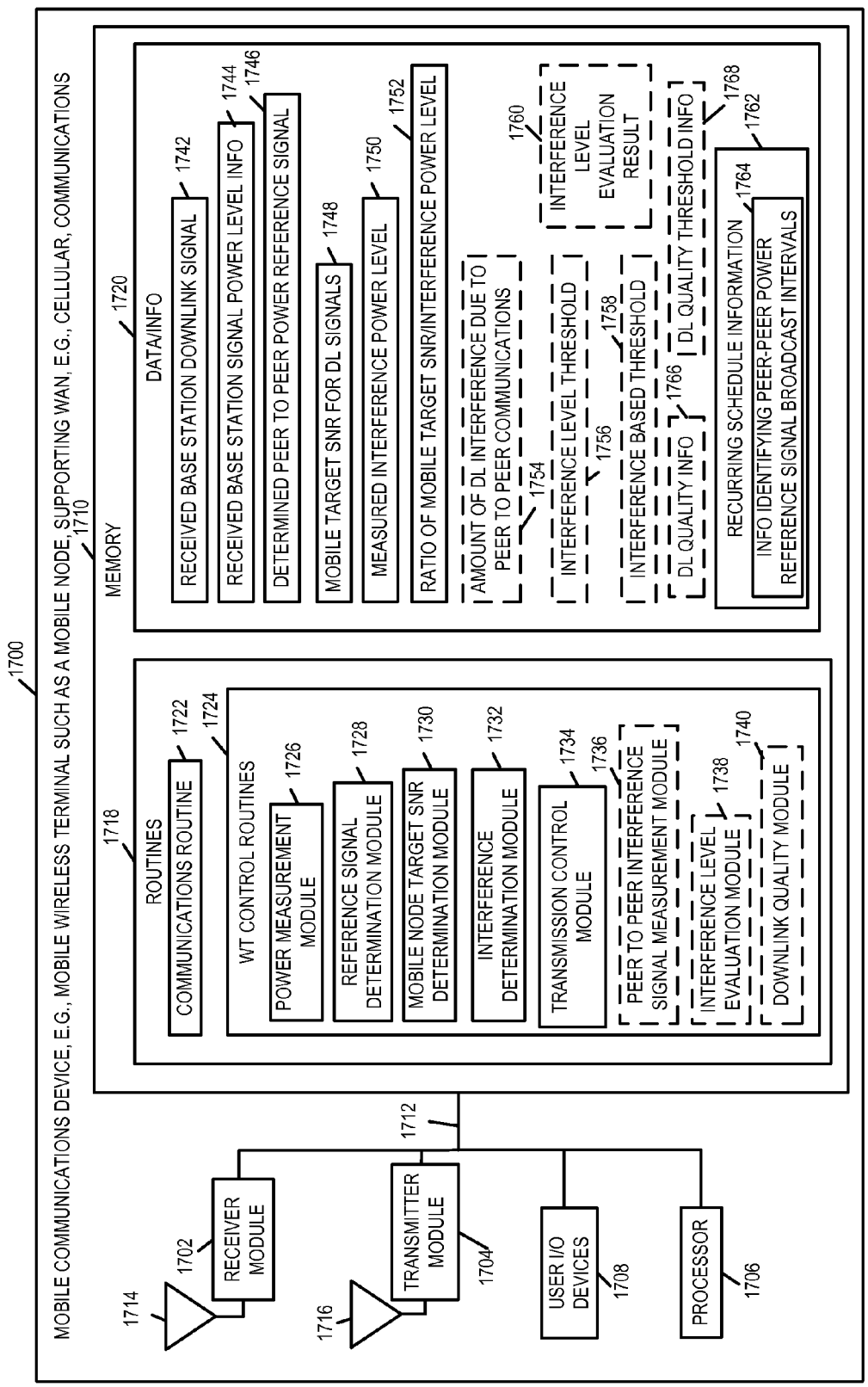
FIG. 17 is a drawing of an exemplary mobile communications device, e.g., an exemplary mobile wireless terminal supporting wide area network (WAN) communications, e.g., cellular communications, and broadcasting information used to influence peer to peer communications, in accordance with various embodiments.

FIG. 17 is a drawing of an exemplary mobile communications device 1700 in accordance with various embodiments. Exemplary mobile communications device 1700 is, e.g., an exemplary mobile wireless communications node such as a mobile node supporting wide area network (WAN), e.g., cellular communications. Exemplary communications device 1700 receives downlink signals in a downlink communications band from a base station acting as a point of network attachment for the communications device 1700. The downlink communications band is also utilized, at least partially, for peer to peer communications, and the peer to peer communications can, and sometimes do, interfere with the reception of the downlink signals by the mobile communications device 1700. The mobile communications device 1700 generates and transmits a peer to peer power reference signal, which it broadcasts. The broadcast peer to peer power reference signal is intended to be used by peer to peer communications devices in the vicinity in determining their transmission power level. Thus mobile communications device 1700 provides control over the power level of peer to peer signaling, and thus control over the amount of interference sourced from peer to peer devices, said interference interfering with reception and recovery of downlink signals from a base station by mobile communications device 1700.

Mobile communications device 1700 includes a wireless receiver module 1702, a wireless transmitter module 1704, a processor 1706, user I/O devices 1708, and memory 1710 coupled together via a bus 1712 over which the various elements may interchange data and information. Memory 1710 includes routines 1718 and data/information 1720. The processor 1706, e.g., a CPU, executes the routines 1718 and uses the data/information 1720 in memory 1710 to control the operation of the communications device 1700 and implement methods.

Receiver module 1702, e.g., an OFDM receiver, is coupled to receive antenna 1714 via which the communications device 1700 receives downlink signals from a base station acting as a point of network attachment. Peer to peer signals, being communicated in the same downlink band, which are received by receiver module 1702 represent a source of interference. Undesired downlink signals from other base stations, e.g., base stations in adjacent cells, communicated on the same downlink band, can be and sometimes are received by receiver module 1702, and also represent interference.

Transmitter module 1704, e.g., an OFDM transmitter, is coupled to transmit antenna 1716, via which the communications device 1700 transmits uplink signals directed to a base station attachment point and peer to peer power reference signals intended for peer to peer wireless terminals in the local vicinity. The peer to peer power reference signal which is broadcast by transmitter module 1704 is based on a received signal from the base station.

User I/O devices 1708 include, e.g., microphone, keyboard, keypad, mouse, camera, switches, speaker, display, etc. User I/O devices 1708 allow a user of mobile communications device 1700 to input data/information, access output data/information, and control at least some functions of the communications device 1700, e.g., initiate a cellular based communications session.

Routines 1718 include a communications routine 1722 and wireless terminal control routines 1724. The communications routine 1722 implements the various communications protocols used by the mobile communications device 1700. The wireless terminal control routines 1724 include a power measurement module 1726, a reference signal determination module 1728, a mobile node target SNR determination module 1730, an interference determination module 1732 and a transmission control module 1734. In various embodiments, routines 1724 include one or more of: peer to peer interference signal measurement module 1736, interference level evaluation module 1738 and downlink quality module 1740.

Data/information 1720 includes a received base station downlink signal 1742, received base station signal power level information 1744, a determined peer to peer power reference signal 1746, a mobile target SNR for downlink signals 1748, a measured interference power level 1750, a ratio of mobile target SNR to interference power level 1752, and recurring schedule information 1762. In various embodiments, data/information 1720 includes one or more of: an amount of downlink interference due to peer to peer communications 1754, an interference level threshold 1756, an interference based threshold 1758, interference level evaluation result 1760, downlink quality information 1766 and downlink quality threshold information 1768.

Power measurement module 1726 measures the power of a received signal from a base station. For example, power measurement module 1726 measures the power of received base station downlink signal 1742 and obtains received base station signal power level information 1744. In one exemplary embodiment, the received base station signal is a pilot channel signal.

Reference signal determination module 1728 determines a peer to peer power reference signal to be broadcast as a function of the measured power. For example, determined peer to peer power reference signal 1746 is an output of reference signal determination module 1728 which uses received base station signal power level information 1744 as an input.

In various embodiments, the reference signal determination module 1728 generates a reference signal which has a lower transmission power when the measured received power is higher than at a time when a measured received power is lower. In some embodiments, the reference signal determination module 1728 generates a reference signal with a lower power level in response to a higher received power. For example, the measured power level of a received base station signal has increased from the last time such a base station signal was measured, and in response the reference signal determination module 1728 generates a new reference signal which has a lower power level than the previously transmitted reference signal.

In some embodiments, the reference signal determination module 1728 generates a reference signal which indicates a higher permitted peer to peer transmission power level when the measured power of the signal from the base station is larger than at another time when the measured power of the signal from the base station is lower.

In various embodiments, the transmission power level of the broadcast peer to peer reference signal is used to communicate a maximum peer to peer transmission power. In some embodiments, a higher transmission power of the reference signal indicates a lower permitted peer to peer transmission power level.

In some embodiments, the function of the measured power, used for determining the peer to peer power reference signal, depends on a mobile node target signal to noise ratio for downlink signals communicated from the base station to the mobile communications device 1700. In some such embodiments, the reference signal determination module 1728 generates a reference signal which has a higher transmission power when the target signal to noise ratio is higher than at least one time when the target signal to noise ratio is lower. For example, in order to attempt to achieve a higher receive SNR for downlink signals the mobile device 1700 increases the peer to peer transmission power reference signal in an attempt to reduce peer to peer transmission power levels in its vicinity, thereby reducing interference sourced from such peer to peer devices.

Mobile node target signal to noise ratio determination module 1730 determines a mobile target signal to noise ratio from a ratio of the measured signal power of the signal received from a base station and a measured interference power level. Mobile target SNR for downlink signals 1748 is an output of module 1730, while received base station power level information 1744 and measured interference power level information 1750 are inputs to module 1730.

Interference determination module 1732 determines measured interference power level 1750. In some embodiments, e.g., some embodiments, where a neighboring base station uses the same downlink frequency band, the measured interference power level is primarily due to interference from other base stations. In various embodiments, the measured interference is a combination of other base station sourced downlink signals and peer to peer signaling, and the relative contributions change over time, as a function of the position of the mobile communications device 1700 with respect to the other base stations and with respect to peer to peer communications devices, as well as the levels of other base station downlink signaling and peer to peer signaling being conducted in the downlink band being used by the mobile communications device 1700. In some embodiments, e.g., some embodiments, where neighboring base stations use different non-overlapping downlink frequency bands, the measured interference power is primarily due to peer to peer communications being conducted in the same downlink band that is being used by mobile communications device 1700 to receive and recover downlink signals.

Transmission control module 1734 controls the transmitter module 1704 to transmit the generated determined peer to peer power reference signal 1746, e.g., in accordance with recurring transmission opportunity positions in a recurring timing schedule. Recurring schedule information 1762 includes information identifying peer to peer power reference signal broadcast intervals 1764.

In some embodiments, the transmission control module 1734 controls the transmitter module 1704 to broadcast a peer to peer power reference signal on a recurring basis according to a predetermined pattern in accordance with recurring schedule information. For example, in one exemplary embodiment, when mobile communications device 1700 is powered on and in an active state of WAN operation, using a base station as a point of network attachment, the mobile communications device 1700 transmits a peer to peer power reference signal at each opportunity identified by information 1764. In other embodiments, the broadcast of the peer to peer power reference signal is conditional.

Peer to peer interference signal measurement module 1736 performs a peer to peer interference signal measurement to measure the amount of downlink interference due to peer to peer communications. Amount of downlink interference due to peer to peer communications 1754 is an output of module 1736. In various embodiments, peer to peer interference measurement module 1736 distinguishes peer to peer sourced interference from other sources of interferences, e.g., other base stations, which may be present in the overall background interference being experienced by mobile communications device 1700 regarding downlink signal reception. In some embodiments, the peer to peer signal interference measurement module 1736 intentionally changes the peer to peer power reference signal by a controlled input amount in order to observe and measure the change in interference observed. Assuming that the non-peer to peer sources of interference remain constant, then the change in detected interference can be associated with peer to peer signaling sources. In some embodiments, e.g., some embodiments where base stations are synchronized, there may be instances where the downlink signaling is intentionally suspended on some or all tones of the downlink band, and during such time the interference contribution from peer to peer signaling may be measured. In some embodiments, e.g., some embodiments where peer to peer signaling follows a recurring timing structure, there may be instances where peer to peer signaling is intentionally suspended on some or all tones of the downlink band, and during such time the interference contribution from other sources, e.g., other base stations, may be measured.

Interference level evaluation module 1738 performs at least one of: i) determining if the measured peer to peer downlink interference exceeds a first threshold; and ii) determining if the ratio of the measured peer to peer downlink interference to the measured received power of the signal from the base station exceeds a second threshold. The first threshold is, e.g., stored interference level threshold 1756, while the second threshold is, e.g., stored interference based threshold 1758. Inputs to interference level evaluation module 1736 include amount of downlink interference due to peer to peer communications 1754 and received base station signal power level information 1744, while interference level evaluation test result 1760 is an output of evaluation module 1738.

In various embodiments including the interference level evaluation module 1738, the transmission control module 1734 controls the transmitter to broadcast a peer to peer power reference signal in response to said interference level evaluation module 1738 determining that a tested level has been exceeded. In some such embodiments, the mobile communications device 1700 does not bother the peer to peer communications device, with respect to sending a peer to peer power reference signal, except when it desires for the peer to peer wireless terminals to back off transmission power and/or cease transmission, e.g., in response to a threshold level being exceeded.

Downlink quality module 1740 monitors downlink signal quality, e.g., determining and maintaining a downlink channel estimate. Downlink signal quality information 1766 is an output of downlink quality module 1740. In some embodiments, the transmission control module 1734 controls the transmitter module 1704 to broadcast a peer to peer reference signal in response to the downlink quality module 1740 detecting that downlink signal quality has dropped below a threshold, e.g., stored downlink quality threshold 1768.

While described primarily in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals. Some embodiments use different signaling technologies in the cellular communications than in the peer to peer communications sharing the same frequency band.

In various embodiments nodes described herein are implemented using one or more modules to perform the steps corresponding to one or more methods, for example, receiving a peer to peer transmission power level reference signal, determining a maximum permitted peer to peer transmission power level, determining an actual peer to peer transmission power level, transmitting a peer to peer signal, measuring a level of interference from peer to peer signaling, determining a peer to peer reference signal, transmitting a peer to peer reference signal, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed:

1. A method of operating a mobile communications device, wherein the method is performed by the mobile communication device, the method comprising:
   receiving a signal from a base station;
   measuring a power of the received signal;
   determining a transmission power level of a peer to peer power reference signal as a function of the measured power of the received signal from the base station, wherein said function of the measured power of the received signal from the base station depends on a mobile target signal to noise ratio for downlink signals communicated from the base station to the mobile communications device; and
   broadcasting the peer to peer power reference signal at the transmission power level.

2. The method of claim 1, wherein determining the transmission power level of the peer to peer power reference signal includes generating a reference signal which has a higher transmission power when the target signal to noise ratio is higher than at least one time when the target signal to noise ratio is lower.

3. The method of claim 1, further comprising:
   determining the mobile target signal to noise ratio to be used for determining said transmission power level of the peer to peer power reference signal from a ratio of the measured power of the received signal from the base station and a measured interference power level.

4. The method of claim 3, wherein the measured interference power level is based on interference from other base stations, wherein the interference from other base stations is greater than interference from peer to peer communications.

5. The method of claim 3, wherein the measured interference power level is based on interference from peer to peer communications, wherein the interference from peer to peer communications is greater than interference from other base stations.

6. The method of claim 1, wherein determining the transmission power level of the peer to peer power reference signal includes generating a reference signal which has a lower transmission power when the measured power of the received signal is higher than at a time when the measured power of the received signal is lower.

7. The method of claim 1, wherein determining the transmission power level of the peer to peer power reference signal includes generating a reference signal with a lower power in response to a higher received power.

8. The method of claim 1, wherein determining the transmission power level of the peer to peer power reference signal includes generating a reference signal which indicates a higher maximum permitted peer to peer transmission power level when the measured power of the received signal from the base station is larger than at another time when the measured power of the received signal from the base station is lower.

9. The method of claim 8, wherein the transmission power level of the broadcast peer to peer power reference signal is used to communicate the maximum permitted peer to peer transmission power level.

10. The method of claim 9, wherein a higher transmission power indicates a lower permitted peer to peer transmission power level.

11. The method of claim 1, wherein broadcasting the peer to peer power reference signal is performed on a recurring basis according to a predetermined pattern.

12. The method of claim 1, further comprising:
    performing a peer to peer interference signal measurement to measure an amount of downlink interference due to peer to peer communications.

13. The method of claim 12, wherein said broadcasting is performed in response to at least one of:
    i) determining that the measured peer to peer downlink interference exceeds a first threshold; and
    ii) determining that a ratio of the measured peer to peer downlink interference to the measured power of the received signal from the base station exceeds a second threshold.

14. The method of claim 1, further comprising:
    monitoring downlink signal quality; and
    wherein said broadcasting is performed in response to detecting that the downlink signal quality has dropped below a threshold.

15. An apparatus comprising:
    a memory; and
    at least one processor coupled to the memory and configured to:
        receive a signal from a base station;
        measure a power of the received signal;
        determine a transmission power level of a peer to peer power reference signal as a function of the measured power of the received signal from the base station, wherein said function of the measured power of the received signal from the base station depends on a mobile target signal to noise ratio for downlink signals communicated from the base station to the apparatus; and
        broadcast the peer to peer power reference signal at the transmission power level.

16. The apparatus of claim 15, wherein said processor is further configured to:
    perform a peer to peer interference signal measurement to measure an amount of downlink interference due to peer to peer communications.

17. The apparatus of claim 15, wherein said processor is further configured to:
    monitor downlink signal quality; and
    wherein said broadcasting is performed in response to detecting that the downlink signal quality has dropped below a threshold.

18. A non-transitory computer readable medium storing computer executable code for operating a mobile communications device, comprising code to:

receive a signal from a base station;
measure a power of the received signal;
determine a transmission power level of a peer to peer power reference signal as a function of the measured power of the received signal from the base station, wherein said function of the measured power of the received signal from the base station depends on a mobile target signal to noise ratio for downlink signals communicated from the base station to the mobile communications device; and
broadcast the peer to peer power reference signal at the transmission power level.

19. The non-transitory computer readable medium of claim 18, further comprising code to:
perform a peer to peer interference signal measurement to measure an amount of downlink interference due to peer to peer communications.

20. The non-transitory computer readable medium of claim 18, further comprising code to:
monitor downlink signal quality; and
wherein said broadcasting is performed in response to detecting that the downlink signal quality has dropped below a threshold.

21. A mobile communications device comprising:
a wireless receiver module for receiving a signal from a base station;
a power measurement module for measuring a power of the received signal;
a reference signal determination module for determining a transmission power level of a peer to peer power reference signal as a function of the measured power of the received signal from the base station, wherein said function of the measured power of the received signal from the base station depends on a mobile target signal to noise ratio for downlink signals communicated from the base station to the mobile communications device; and
a wireless transmitter module for broadcasting the peer to peer power reference signal at the transmission power level.

22. The mobile communications device of claim 21, wherein said reference signal determination module is further configured to generate a reference signal which has a higher transmission power when the target signal to noise ratio is higher than at least one time when the target signal to noise ratio is lower.

23. The mobile communications device of claim 21, further comprising:
a mobile node target signal to noise ratio determination module for determining said mobile target signal to noise ratio from information including a ratio of the measured power of the received signal from the base station and a measured interference power level.

24. The mobile communications device of claim 23, further comprising:
an interference determination module for determining said measured interference power level, and wherein the measured interference power level is based on interference from other base stations, wherein the interference from other base stations is greater than interference from peer to peer communications.

25. The mobile communications device of claim 23, further comprising:
an interference determination module for determining said measured interference power level, and wherein the measured interference power level is based on interference from peer to peer communications, wherein the interference from peer to peer communications is greater than interference from other base stations.

26. The mobile communications device of claim 23, further comprising:
an interference determination module for determining said measured interference power level, and wherein the measured interference power level is due to interference from both other base stations and from peer to peer communications, and wherein relative contributions from the other base stations and the peer to peer communications change over time.

27. The mobile communications device of claim 21, wherein said reference signal determination module generates a reference signal which has a lower transmission power when the measured power of the received signal is higher than at a time when the measured power of the received signal is lower.

28. The mobile communications device of claim 21, wherein a reference signal generation module generates a reference signal with a lower power level in response to a higher received power.

29. The mobile communications device of claim 21, wherein said reference signal determination module generates a reference signal which indicates a higher maximum permitted peer to peer transmission power level when the measured power of the received signal from the base station is larger than at another time when the measured power of the received signal from the base station is lower.

30. The mobile communications device of claim 29, wherein the transmission power level of the broadcast peer to peer power reference signal is used to communicate the maximum permitted peer to peer transmission power level.

31. The mobile communications device of claim 30, wherein a higher transmission power indicates a lower permitted peer to peer transmission power level.

32. The mobile communications device of claim 21, further comprising:
a memory including recurring schedule information identifying time intervals for broadcasting a peer to peer reference signal; and
a transmission control module for controlling said transmitter module to broadcast the peer to peer power reference signal on a recurring basis according to a predetermined pattern in accordance with said recurring schedule information.

33. The mobile communications device of claim 21, further comprising:
a peer to peer interference signal measurement module for performing a peer to peer interference signal measurement to measure an amount of downlink interference due to peer to peer communications.

34. The mobile communications device of claim 33, further comprising:
an interference level evaluation module for performing at least one of:
i) determining if the measured peer to peer downlink interference exceeds a first threshold; and
ii) determining if a ratio of the measured peer to peer downlink interference to the measured power of the received signal from the base station exceeds a second threshold.

35. The mobile communications device of claim 34, further comprising:
a transmission control module for controlling said transmitter module to broadcast the peer to peer power reference signal in response to said interference level evaluation module determining that a tested level has been exceeded.

36. The mobile communications device of claim 21, further comprising:
  a downlink quality module for monitoring downlink signal quality; and
  a transmission control module for controlling said transmitter module to broadcast the peer to peer power reference signal in response to said downlink quality module detecting that the downlink signal quality has dropped below a threshold.

37. A mobile communications device comprising:
  wireless receiver means for receiving a signal from a base station;
  means for measuring a power of the received signal;
  means for determining a transmission power level of a peer to peer power reference signal as a function of the measured power of the received signal from the base station, wherein said function of the measured power of the received signal from the base station depends on a mobile target signal to noise ratio for downlink signals communicated from the base station to the mobile communications device; and
  means for broadcasting the peer to peer power reference signal at the transmission power level.

38. The mobile communications device of claim 37, further comprising:
  means for performing a peer to peer interference signal measurement to measure an amount of downlink interference due to peer to peer communications.

39. The mobile communications device of claim 37, further comprising:
  means for monitoring downlink signal quality; and
  means for controlling said means for broadcasting, to broadcast the peer to peer power reference signal in response to said means for monitoring detecting that the downlink signal quality has dropped below a threshold.

\* \* \* \* \*